US006401149B1

(12) United States Patent
Dennin et al.

(10) Patent No.: US 6,401,149 B1
(45) Date of Patent: Jun. 4, 2002

(54) METHODS FOR CONTEXT SWITCHING WITHIN A DISK CONTROLLER

(75) Inventors: William W. Dennin, Lake Forest; Theodore C. White, Rancho Santa Marguerita, both of CA (US)

(73) Assignee: Qlogic Corporation, Aliso Viejo, CA (US)

( * ) Notice: Subject to any disclaimer, the term of this patent is extended or adjusted under 35 U.S.C. 154(b) by 0 days.

(21) Appl. No.: 09/548,330

(22) Filed: Apr. 12, 2000

Related U.S. Application Data

(60) Provisional application No. 60/132,712, filed on May 5, 1999.

(51) Int. Cl.⁷ .............................................. G06F 13/00
(52) U.S. Cl. .............................. 710/58; 710/20; 710/7; 710/102; 712/228
(58) Field of Search ..................... 709/102–105, 709/107–108; 710/5–9, 14, 20–38, 52–57, 59–61; 712/228, 227, 226, 225, 224, 223, 222, 221, 204

(56) References Cited

U.S. PATENT DOCUMENTS

| 5,127,098 A | * | 6/1992 | Rosenthal et al. | 711/202 |
| 5,315,708 A | | 5/1994 | Eidler et al. | 395/250 |
| 5,420,984 A | * | 5/1995 | Good et al. | 710/22 |
| 5,572,148 A | * | 11/1996 | Lytle et al. | 326/41 |
| 5,649,230 A | * | 7/1997 | Lentz | 710/52 |
| 5,841,722 A | * | 11/1998 | Willenz | 365/221 |
| 5,890,207 A | | 3/1999 | Sne et al. | 711/113 |
| 5,907,717 A | * | 5/1999 | Ellis | 370/360 |
| 5,983,293 A | * | 11/1999 | Murakami | 710/56 |
| 6,029,226 A | * | 2/2000 | Ellis et al. | 711/100 |
| 6,070,200 A | * | 5/2000 | Gates et al. | 710/20 |
| 6,081,849 A | * | 6/2000 | Born et al. | 710/7 |

FOREIGN PATENT DOCUMENTS

WO    WO 98/14861    4/1998

OTHER PUBLICATIONS

PCT International Search Report, filed Sep. 13, 2000.

* cited by examiner

Primary Examiner—Christopher B. Shin
(74) Attorney, Agent, or Firm—Knobbe, Martens, Olson & Bear, LLP

(57) ABSTRACT

The present invention is related to methods and systems for context switching within a disk controller, allowing controller processors to efficiently switch between multiple tasks. In a first mode, a first memory is used to temporarily store data being transferred between a disk storage device coupled to the disk controller and a bus coupled to the disk controller. The transfer is managed by a disk controller processor. A first context is stored in a second memory coupled to the disk controller processor. In a second mode, the first memory is used to store a second context for later use by the disk controller processor. At least a portion of the first context information stored in the second memory is swapped with at least a portion of the second context information stored in the first memory at least partly in response to a first event. The swapped portion is then swapped back to the second memory in response to a second event.

21 Claims, 18 Drawing Sheets

METHODS FOR CONTEXT SWITCHING WITHIN A DISK CONTROLLER

The present application claims priority from U.S. Provisional Patent Application No. 60/132,712 filed on May 5, 1999. The contents of that application, in its entirety, is hereby incorporated by reference.

FIELD OF THE INVENTION

The present invention relates generally to disk controllers and more particularly to disk controllers having a multi-ported memory architecture.

BACKGROUND OF THE INVENTION

Conventional computer systems typically include several functional units. These functional units may include a central processing unit (CPU), main memory, input/output devices, and magnetic disk drives. In conventional systems, the main memory is tightly coupled to the CPU via a system bus or a local memory bus. The main memory is used to provide the CPU quick access to data or program information that is stored in main memory at execution time. Typically, the main memory is composed of random access memory (RAM) circuits. A computer system including the combination of the CPU and the main memory is often referred to as a host system.

The main memory is typically smaller than the magnetic disk drive. The main memory is usually volatile, while the magnetic disk drive is non-volatile. Therefore, programming data information is often stored on the magnetic disk drive and is read into the main memory as needed. In contrast to the main memory, which is closely coupled to the CPU, the magnetic disk drive is usually more remotely coupled to the CPU. Because the magnetic disk drive is more remotely coupled to the CPU, access to the magnetic disk drive is typically slower and more complicated than access to the main memory. A disk controller typically couples the host system to the magnetic disk drive and handles the complex details of interfacing the magnetic disk drive to the host system. Communications between the host system and the disk controller is usually provided using one of a variety of standard I/O bus interfaces.

The magnetic hard disk drive assembly usually consists of one or more magnetic disks. Each disk typically has a number of concentric rings or tracks on which data is stored. The tracks themselves are further divided into sectors which are the smallest accessible data unit. A sector is accessed by positioning a magnetic head above the appropriate track. The first sector of a track is typically identified by an index pulse. The start of each other track sector is identified with a sector pulse. The drive waits until the desired sector rotates beneath the head and then proceeds to read or write the data. The date is accessed serially, one bit at a time. Usually, each disk in the disk drive has its own read/write head.

The disk drive is connected to the disk controller. The disk controller performs numerous functions, such as, for example, converting digital data to analog head signals, converting analog head signals to digital data, disk formatting, error checking, logical-to-physical address mapping, and data buffering. For example, the disk drive typically formats the data from the drive. The data from the drive is serially arranged and the disk controller converts the serial data into a parallel arrangement.

The data buffering function is used in transferring data between the host and the mass storage memory. Data buffering is needed because the speed at which the disk drive can supply or accept data from the host is different then the speed at which the host can correspondingly read or supply the data. Therefore, the disk controller conventionally contains a buffer memory that temporarily stores data being read or written to the hard drive to synchronize the data with the speed of the I/O bus to which it is connected. Thus, the buffer decouples the rate at which data is exchanged between the drive and host and the rate at which data is written and read from the drive. The buffering function is particularly necessary because each sector is read or written as a whole.

In addition to providing access to both the I/O bus and the disk drive, the buffer memory often is accessed by a local processor on the disk controller. Thus, the disk controller buffer memory may be accessed by many functional portions of the disk controller and by the host. In conventional systems, the competition for access to the buffer memory is often a bottleneck which greatly restricts the data transfer rates between the buffer memory and the functional units, as well as to the disk drive and the host.

Another performance bottleneck found in conventional disk controllers is the local processor. The local processor typically manages an I/O bus interface circuit, the buffer memory, the disk formatter, as well as management of the disk controller as a whole. Furthermore, conventional systems require the local processor to manage data transfers through the buffer memory at a low level. Typical general-purpose processors are inadequate to handle such application specific functions in an efficient manner.

In addition, conventional disk controllers do not fully utilize their processors. For example, if, while transferring data from the disk to the I/O bus using one or more the disk controller processors, the transfer outpaces the disk's ability to supply data, the processors are wastefully paused until the disk catches up.

SUMMARY OF THE INVENTION

The present invention is generally related to efficient and flexible methods and systems of buffering and accessing data being written to or read from mass storage devices.

In one embodiment, a disk controller includes a data buffer used to buffer data transferred between a mass storage device and an I/O bus. In another embodiment, the data buffer includes a multi-port memory. The multi-port memory is coupled to a plurality of channels, such as, by way of example, a disk channel and an I/O channel, as well as one or more processors.

In one embodiment, the multi-port memory may be used as both a random access memory and a first-in-first-out (FIFO) memory. Thus, when used as a first-in-first out memory, the multi-port memory may be used to buffer data between the disk channel and I/O channel. The multi-port memory may be used for context switching, wherein register data from one or more processors is swapped in or out of the memory. The efficient register swapping provided by one embodiment of the present invention advantageously allows the processor to quickly switch between tasks. This is very useful if a first task is in a wait state, because rather than wasting processor time pausing while waiting for the wait state to end, the processor can quickly switch to another task, and then, after the wait state has ended for the first task, switch back to the first task.

In addition, in one embodiment, the random access feature allows selected data stored in the multi-port memory to be swiftly retrieved. For example, if the memory is used to store a Fibre Channel frame and associated CRC data, the CRC data can be immediately retrieved without having to read out the entire frame.

In one embodiment, the multi-port memory is a DMA (direct memory access) memory. In an exemplary embodiment, the multi-port memory's ports include a random access port, a FIFO access port, a register access port, and/or a buffer controller DMA port. The random access port is connected to a microprocessor interface bus which in turn is connected to one or more processors, such as a microprocessor and a microcontroller, as well as the FIFO access port. The register access port is may also be connected to one or processors, such as a microcontroller. The buffer controller DMA port is connected to a CRC (cyclic redundancy code) checker and to a buffer memory.

In one embodiment, the multi-port memory contains 64 bytes and can hold an entire Fibre Channel protocol command. Furthermore, a state machine associated with the multi-port memory can perform several commands. In another embodiment, one or more of the commands are configured to efficiently manage I/O packets or frames. In yet another embodiment, the state machine commands include one or more of the following: a fetch current FCP (Fibre Channel Protocol) command, an update current FCP pointer command, a load FIFO command, an unload FIFO command, a load FIFO with CRC, an unload FIFO with CRC, a write to buffer memory command, and a read from buffer memory command. In one embodiment, a command is provided that causes the transfer of an entire Fibre Channel command into the FIFO without further intervention from the microprocessor or the microcontroller. One embodiment provides direct frame access to Fibre Channel frames. In another embodiment, the commands may be halted and/or paused.

DETAILED DESCRIPTION OF A PREFERRED EMBODIMENT

The present invention is generally related to efficient and flexible methods and system for buffering data being written to or read from a mass storage device.

Figure 1:
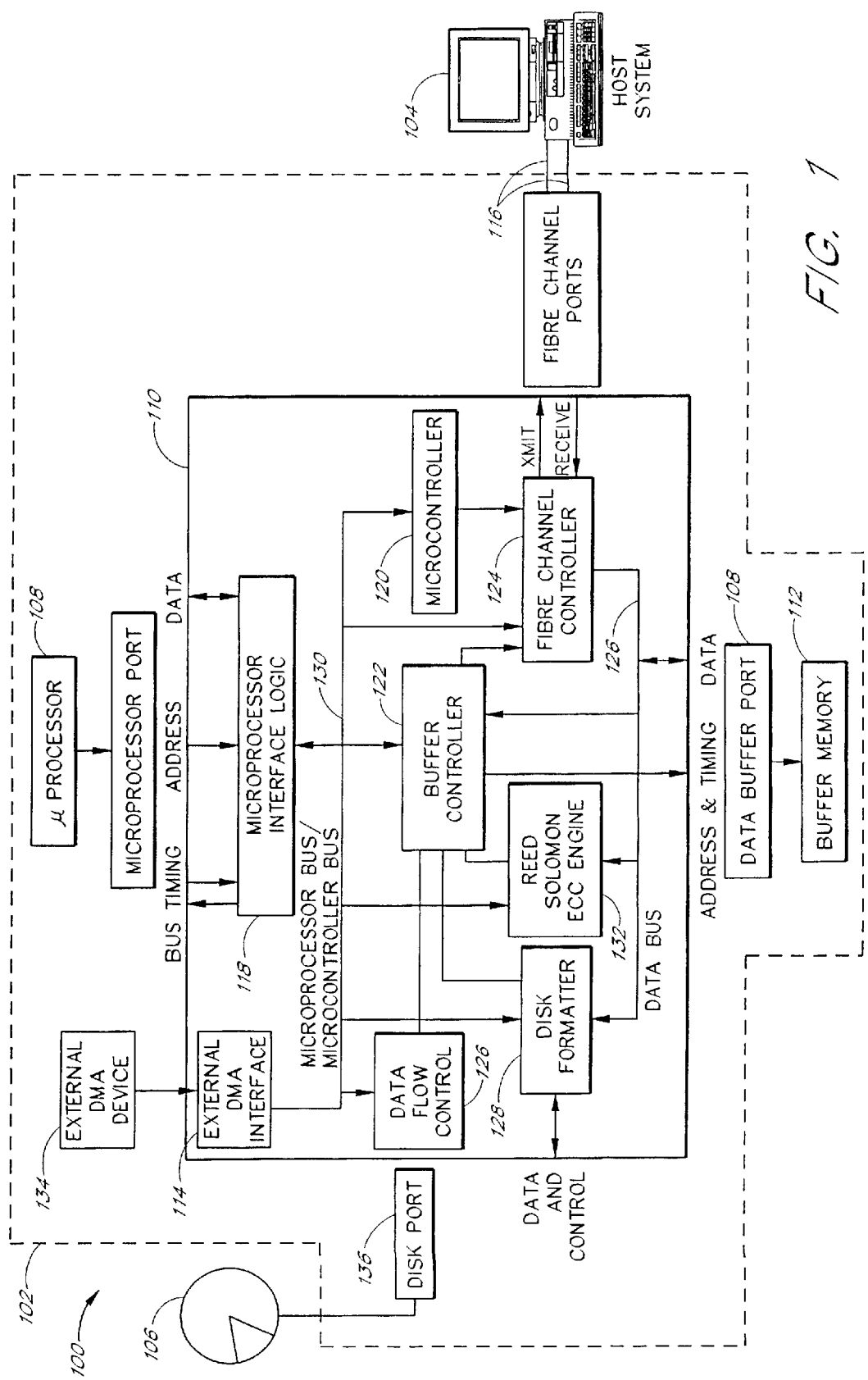
FIG. 1 is an illustration of one environment using one embodiment of the present invention.

As illustrated in FIG. 1, in one embodiment of an electronic system 100, a disk controller 102 is used to interface a host system 104 to a mass storage device 106, such as a magnetic disk drive or an optical disk drive, via a disk port 136. The illustrated disk controller 102 includes a microprocessor 108, an embedded controller 110, buffer memory 112, and an external DMA (direct memory access) device 114. The disk controller is coupled to the host system 104 via an I/O bus 116, such as a Fibre Channel bus having dual loops. The embedded controller 110 includes a microprocessor interface 118 which is coupled to the microprocessor 108. A microprocessor bus 130 couples the microprocessor interface logic 118 to the external DMA interface 134, a microcontroller 120, a buffer controller 122, and a Fibre Channel interface 124 located within the embedded controller 110. The external DMA interface 134 in turn is coupled to the external DMA device 134 and to the buffer controller 122. The buffer controller 122 is also coupled to the buffer memory 112 and to the Fibre Channel interface 124. The Fibre Channel interface 124 is coupled to Fibre Channel loops 116 via Fibre Channel transmit and receive circuitry within the interface 124. The Fibre Channel loops 116 are also connected to one or more hosts 104. The Fibre Channel interface 124 can be used to communicate both Fibre Channel protocol and SCSI protocol.

A data flow controller 126 is coupled to the external DMA interface 134, the buffer controller 122, and the Fibre Channel interface 124. An ECC engine module 132 is connected to the disk formatter 128, the buffer controller 122, and the Fibre Channel interface 124, via the data bus 126.

The Fibre Channel interface 124 implements the Fibre Channel protocol. In one embodiment, the Fibre Channel interface 124 implements the FC-AL (Fibre Channel Arbitrated Loop) protocol including the FC-1 and FC-2 layers of the Fibre Channel signaling interface. The Fibre Channel interface 124 includes an encoder and decoder and a frame buffer for clock skew management and a Fibre Channel protocol handler machine. The Fibre Channel interface 124 validates and routes data trains received from the Fibre Channel loops to appropriate areas in the frame buffer. The transmit path of the Fibre Channel interface 122 transmits frames from the frame buffer to the Fibre Channel. The Fibre Channel interface automatically handles frame delimiters and frame control.

In one embodiment, the disk formatter 128 provides an interface to the disk 106. The disk formatter 128 receives control information and parameters from the local processor 108. The disk formatter 108 then carries out the requested action. The microprocessor may also handle other tasks, such as signal processing for servo control of the disk head, and SCSI protocol management, which may be used to communicate data over the Fibre Channel. The microcontroller 120 may be used to perform other tasks, including low level tasks such as Fibre Channel transfer management tasks, thereby offloading the processor 108. Thus, in one embodiment, the controller workload is advantageously divided among multiple processors, allowing for more efficient task execution.

In one embodiment, the microcontroller 120 is an 8 bit machine which can support either 8 bit or 16 bit DMA transfers. In addition, the microcontroller 120 has registers and an internal ALU, including an accumulator used for mathematical operations.

In one embodiment, the buffer controller 122 is a multiple channel DMA controller integrated with a synchronous DRAM (SDRAM) controller. In another embodiment, the buffer controller 122 supports buffer sizes of up to four megabytes. However, in still another embodiment, sizes greater or less than four megabytes are supported as well. The buffer controller 122 provides for high-speed buffer memory 112 initialization and verification and reduces power upon initialization. The buffer controller 122 also provides controls to the buffer memory 112, which, in one embodiment, is implemented using synchronous DRAM (SDRAM). However, other memory architectures, such as asynchronous RAM or static RAM, can be used as well.

Buffer management is provided by a four-channel, high speed, bursting DMA controller. The buffer controller 122 provides an interface between a variety of modules and interfaces, including, by way of example, the buffer or holding memory 112, the disk channel, an ECC channel, the Fibre Channel, the microprocessor 108 and the microcontroller 120. The buffer controller 122 regulates and buffers data movement into and out of the SDRAM buffer memory 112. Each DMA channel supports DMA bursting of multiple blocks of data, allowing high bandwidth transfers. Each DMA channel has associated control, configuration, and buffer memory address registers. In one embodiment, the buffer memory 112 is shared by other units which are provided with access-turns or access tenures. Within the tenure, a given data source bursts data until the transfer is complete or an assigned tenure time has expired. However, many of the DMA channels are connected to modules running on a different clock or at a different speed than that of the buffer controller 122. Hence, as discussed below, a memory unit configurable as a FIFO (first-in-first-out) memory is used to synchronize and buffer channel data.

The buffer controller 122 also provides microprocessor address decoding, priority arbitration for the buffer resource, block CRC (BCRC) checking, and automatic DRAM refresh control. In one embodiment, a CRC calculator/checker includes an accumulator with feedback.

The data flow controller 126 reduces data transfer time by, in one embodiment, automatically monitoring and controlling the flow of data between the disk 106 and the Fibre Channel ports. Automatic control of data flow between these channels reduces the number of interrupts that occur in a typical disk-to-Fibre Channel data transfer. In addition, the data flow controller 126 automatically helps prevent buffer overflow and underflow conditions while temporarily suspending or pausing, the disk formatter or the Fibre Channel DMA channel before the buffer becomes full or empty.

Exemplary data flow operations between the host 104 and the disk 106 will now be described. A typical write operation proceeds as follows. The host 104 sends a write command over the Fibre Channel bus 116 to the disk controller 102. The command passes through the Fibre Channel interface 124 and is then loaded via the bus controller 124 into the buffer memory 112. The host path to the disk controller is termed Channel 1.

Once the write command is written into the buffer memory 112, the microprocessor 108 reads the command out of the buffer memory 112 and appropriately sets up the disk controller registers in preparation for the commanded write operation. The disk controller registers include registers associated with the buffer controller 122, the disk formmatter 128, and the data flow controller 126. Once the setup is complete, the microprocessor 108 notifies the host 104 that the disk controller 102 is ready to receive the write data. The host 104 then initiates a DMA (direct memory access) transfer into the buffer memory 112. During the buffer load operation, the CH1 module 310 continuously calculates a CRC based upon the write data. The calculated CRC is stored in the buffer memory 112 with the associated write data. The data flow controller 126 monitors when a given number of sectors are stored in the buffer memory 112 and initiates the transfer from the buffer memory 112 through the buffer controller 122 to the disk formatter 128 and from there, the disk formatter 128 writes the data to the disk 106 via the write channel. As the data is read out of the buffer memory 112 and written to the disk 106, an associated ECC code is calculated and appended to the end of the sector data. When the write operation is completed, the microprocessor 108 generates an interrupt which is transmitted over the Fibre Channel interface to the host 104, thereby informing the host 104 that the write operation is complete.

A read operation is performed in a similar fashion as the write operation, but in reverse. The host 104 sends a read command to the disk controller 102 which in turn stores the read command into the buffer memory 112. The microprocessor 108 then reads the command out of the buffer memory 112 and appropriately initializes the various functional blocks of the disk controller 102 to perform the read. The data is read from the disk 106 and passes through the disk formatter 128 to the buffer controller 122, and from the buffer controller 122 to the buffer memory 112. Both the data and the associated CRC are stored together in the buffer memory 112. The ECC module 132 monitors the data transfer and calculates the ECC code throughout this data storing operation. Upon completion of the ECC calculation, the ECC module 132 determines which errors occurred in the read data and appropriately corrects those errors in the buffer memory 112. The CH1 module 310 reads data from buffer memory 112, then checks the CRC of the resulting stored sector from the buffer memory 112 and ensures that there are no errors. Once it is determined that there are no errors remaining in the data, the data is transferred from the buffer memory 112 through the buffer controller 122 and out to the host bus. The CRC code is stripped off during this process so that only data is sent to the host 104.

Figure 2:
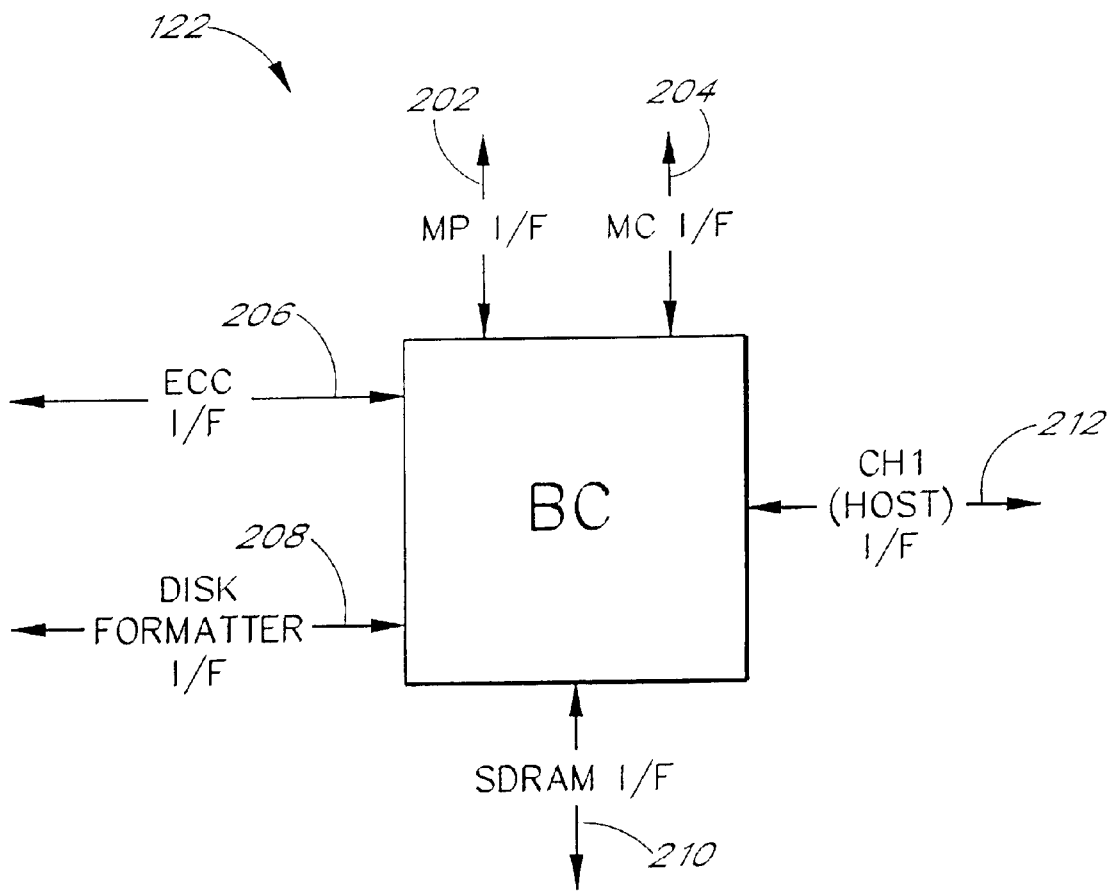
FIG. 2 is an illustration of the ports of one embodiment of a buffer controller.

FIG. 2 illustrates one embodiment of the interfaces to the buffer controller. The buffer controller is coupled to a microprocessor interface 202, a microcontroller interface 204, an ECC interface 206, a disk formatter interface 208, a host interface 212, and an SDRAM buffer memory interface 210. The buffer controller utilizes corresponding FIFOs to buffer the data transferred between the various interfaces.

Figure 3:
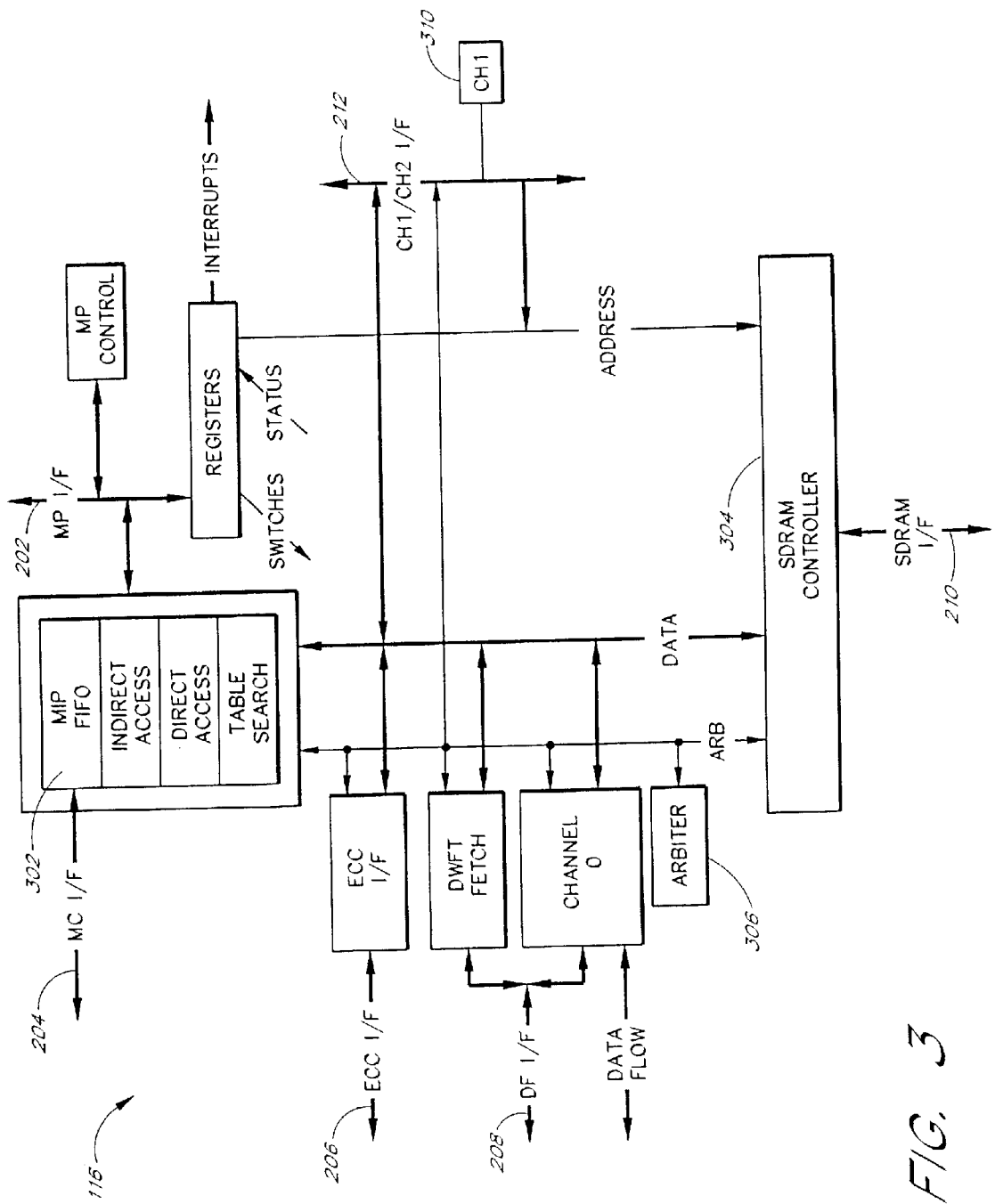
FIG. 3 is a more detailed illustration of the buffer controller of FIG. 2.

FIG. 3 is a more detailed illustration of one embodiment of the buffer controller 122. The buffer controller 122 includes a memory unit 302 configurable as a FIFO with four ports. For example, the MP FIFO 302 may have a random or direct access interface, a FIFO or indirect access interface, a register access interface, and a buffer controller DMA interface. The FIFO 302 may be accessed by many clients and other devices, and thus acts as a switching station, allowing data to be temporarily stored while being routed from one place to another. In the illustrated embodiment, the DMA interface is used to provide access to the buffer memory 112. The register access interface, wherein all or part of the FIFO is locally addressable as an internal register file by the microcontroller 120, provides one of several access paths to the microcontroller 120. The indirect access interface, wherein all or part of the FIFO is addressable using FIFO pointers, provides still another access path. The direct access interface, wherein all or part of the FIFO is addressable as random access memory, and is memory mapped, provides still another access path.

In one embodiment, all or a portion of the FIFO 302 is within address space of one or more processors, such as the microprocessor 108 and/or the microcontroller 120. In another embodiment, the FIFO 302 may have more or fewer ports. By providing multiple types of FIFO access ports, the flexibility, efficiency, and throughput of data transfers through the FIFO 302 is greatly enhanced. The FIFO 302 further provides the microprocessor 108 with access to disk format tables, data, program code, and Fibre Channel command blocks, stored in the FIFO 302 or in the buffer memory 112. For example, the FIFO 302 may be used to overlay programs stored in the buffer memory 112. Hence, the FIFO 302 may also be termed an MP (microprocessor) FIFO or MP DMA FIFO.

Figure 7:
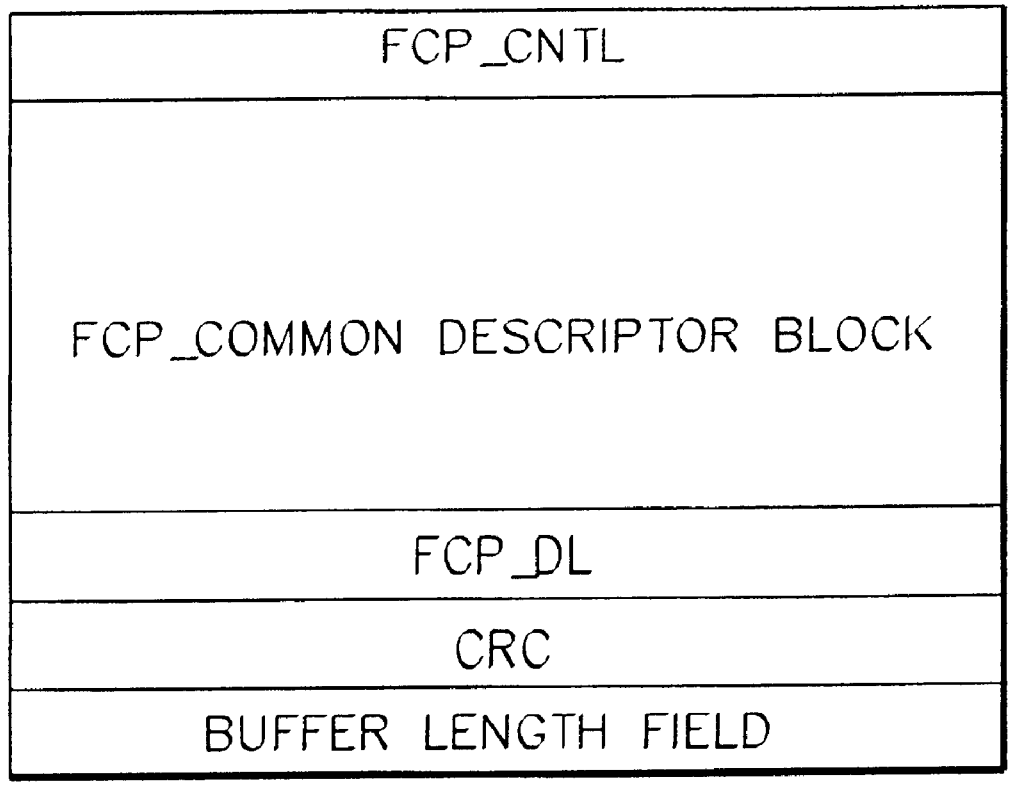
FIG. 7 is an illustration of a Fibre Channel control block.

In one embodiment, the MP FIFO 302 includes 64 bytes of storage. As discussed below, this advantageously provides enough storage memory to hold a complete Fibre Channel command, in addition to an associated CRC and buffer length field. The format of the Fibre Channel command is illustrated in FIG. 7. The FIFO 302 can be used to burst data to and from the buffer memory 112. Thus, data transfer latencies may be greatly reduced. The random access port may be accessed via the microprocessor bus and microcontroller bus 130, which respectively connect to the microprocessor 108 and the microcontroller 120. In addition, the microcontroller 120 can access the MP FIFO 302 via the register access port. The buffer controller DMA port provides an interface to the SDRAM buffer memory 112 as well as to the CRC checker and generator. Various buffer controller functional blocks or modules are interconnected by an internal buffer controller data bus. Thus, in one embodiment, the FIFO 302 can be accessed by direct addressing as a random access memory. In addition, the MP FIFO 302 can be accessed as a first-in-first out memory, with data loaded and unloaded to and from the FIFO 302 via a FIFO access register or port.

Figure 4:
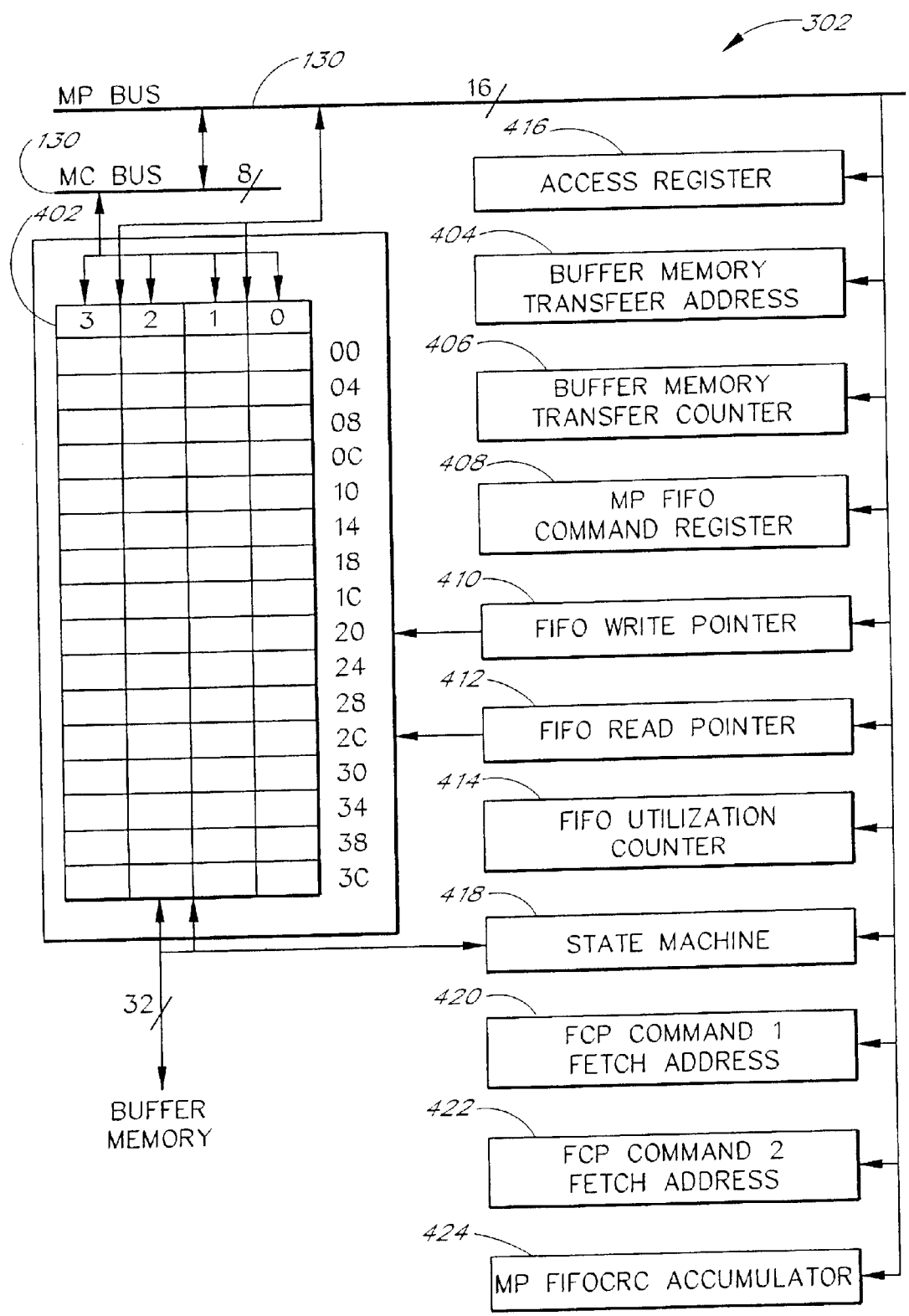
FIG. 4 illustrates one embodiment of a memory unit.
Figure 5A:
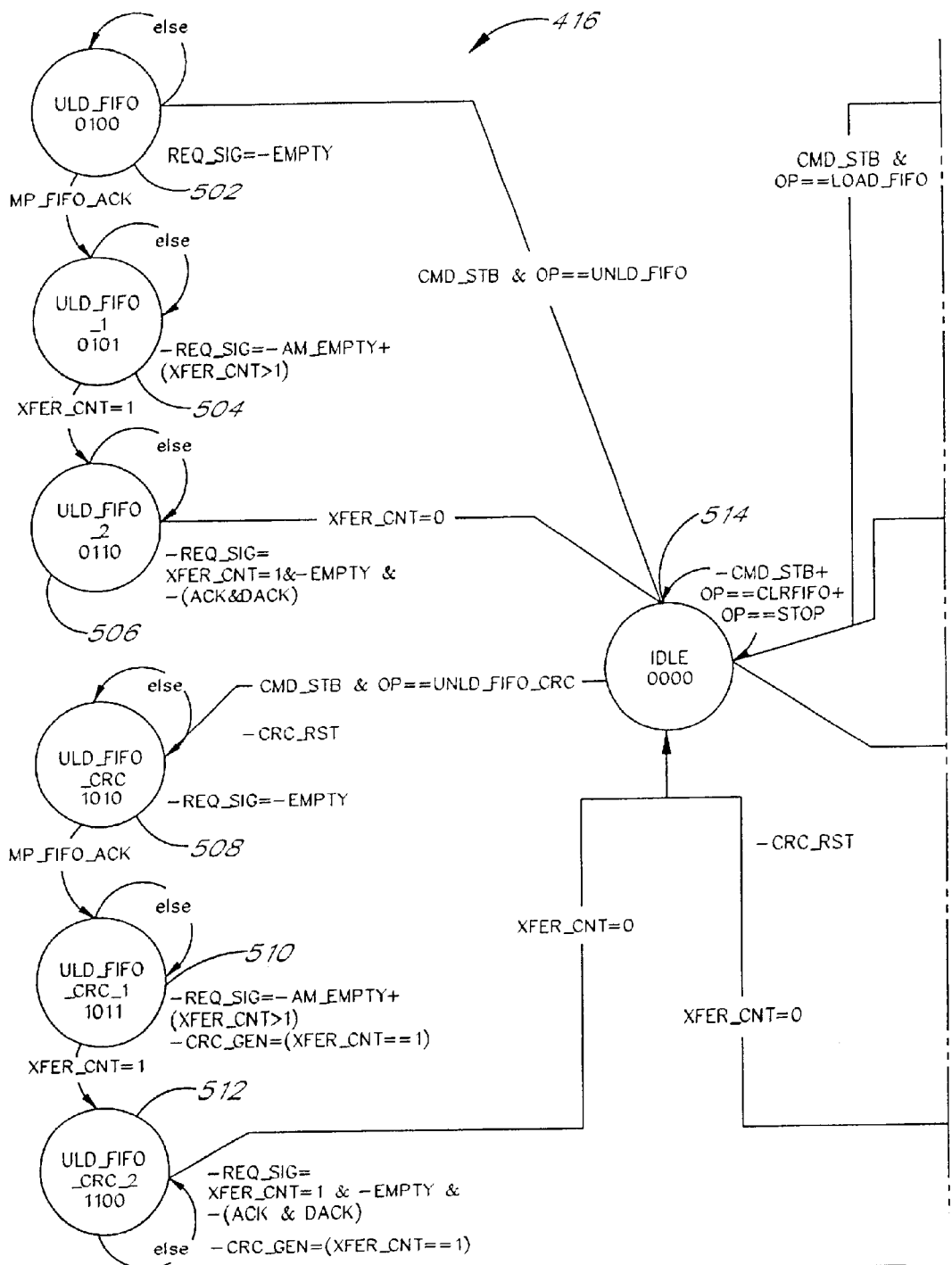
FIGS. 5A–D illustrate one embodiment of a state machine used with the buffer controller.
Figure 5:
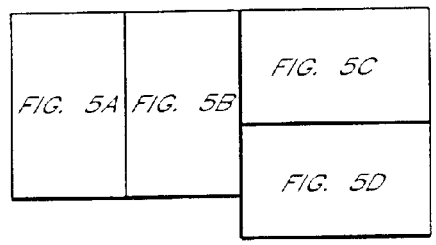
Figure 5B:
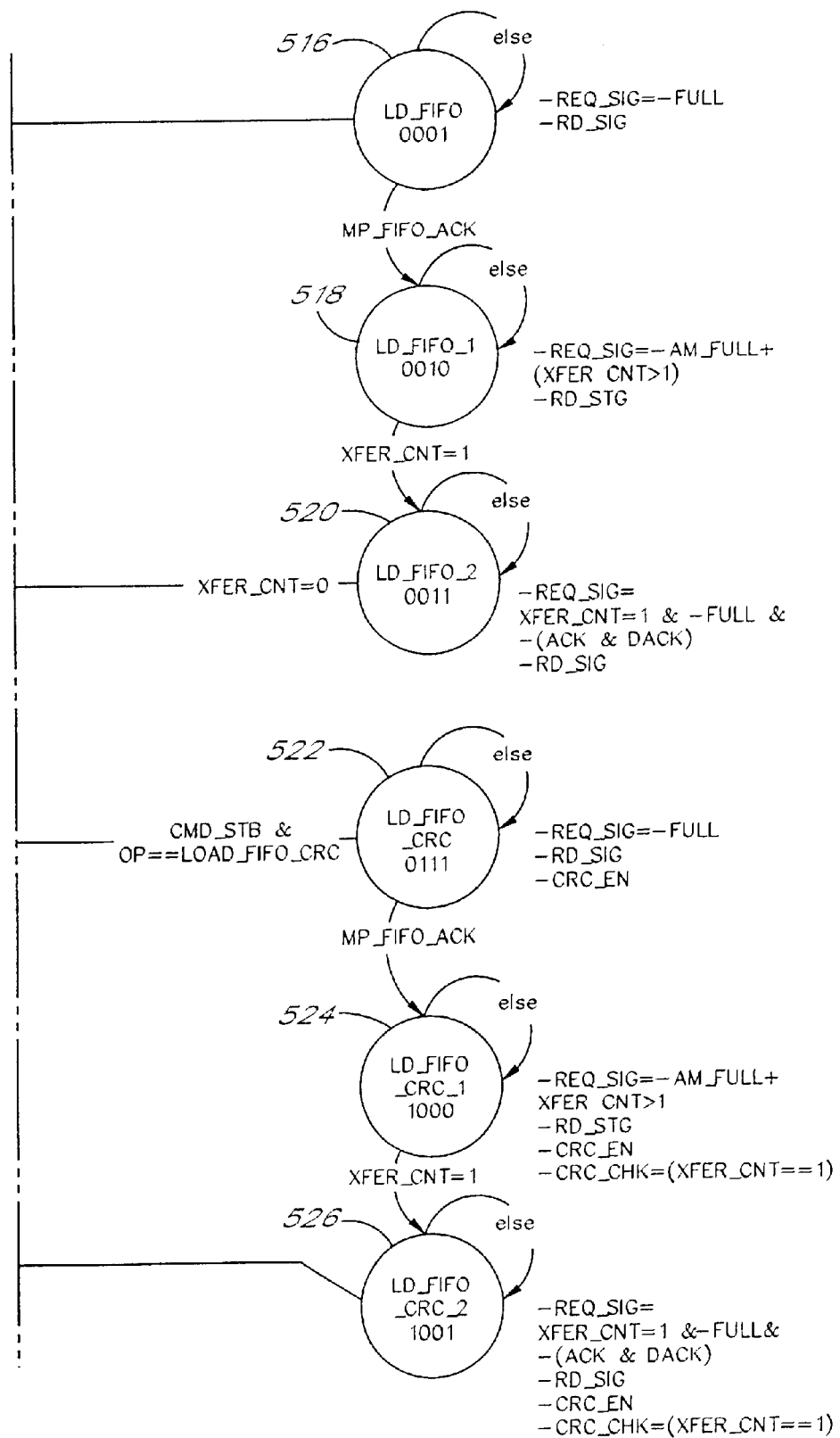
Figure 5C:
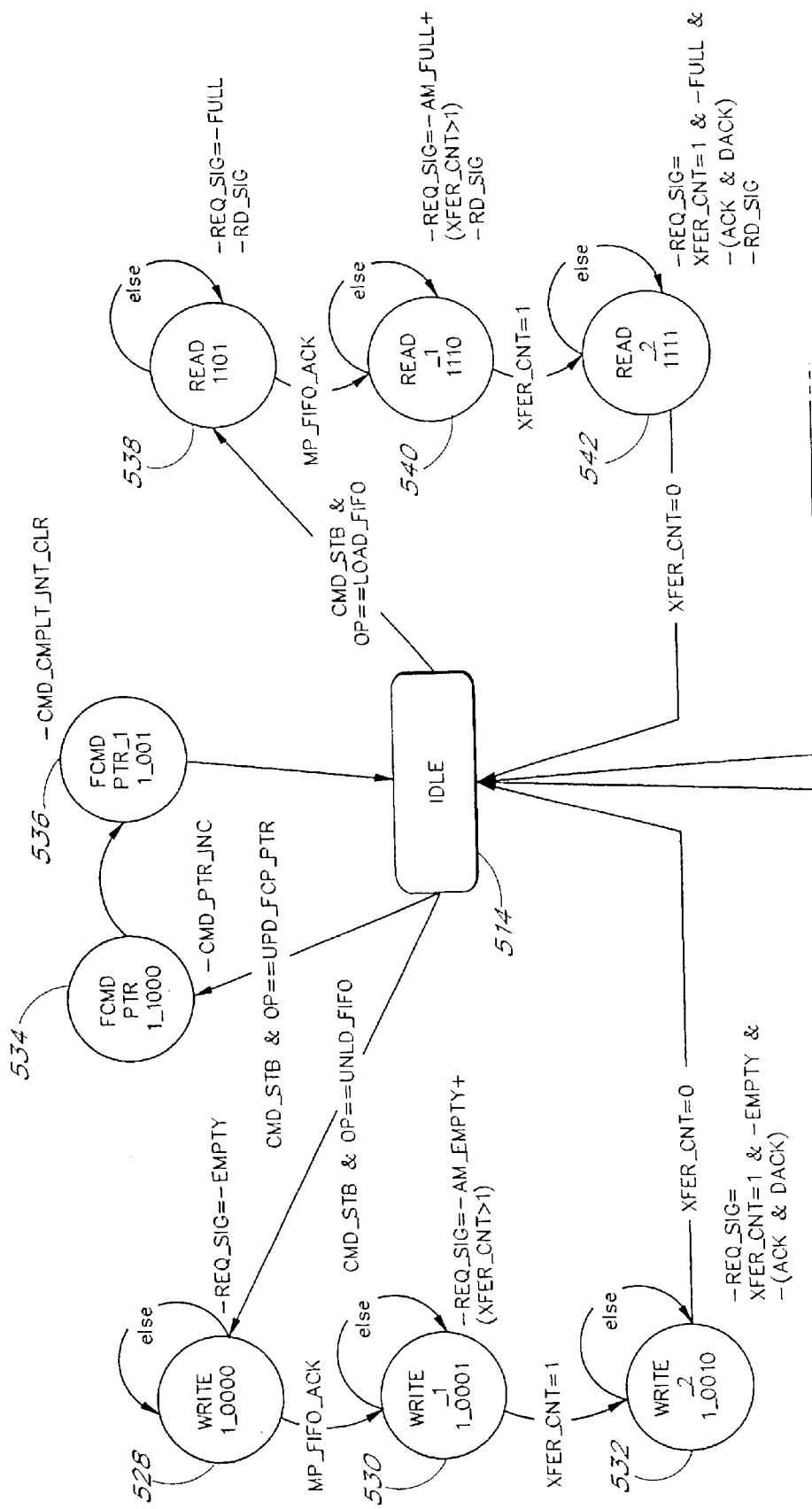
Figure 5D:
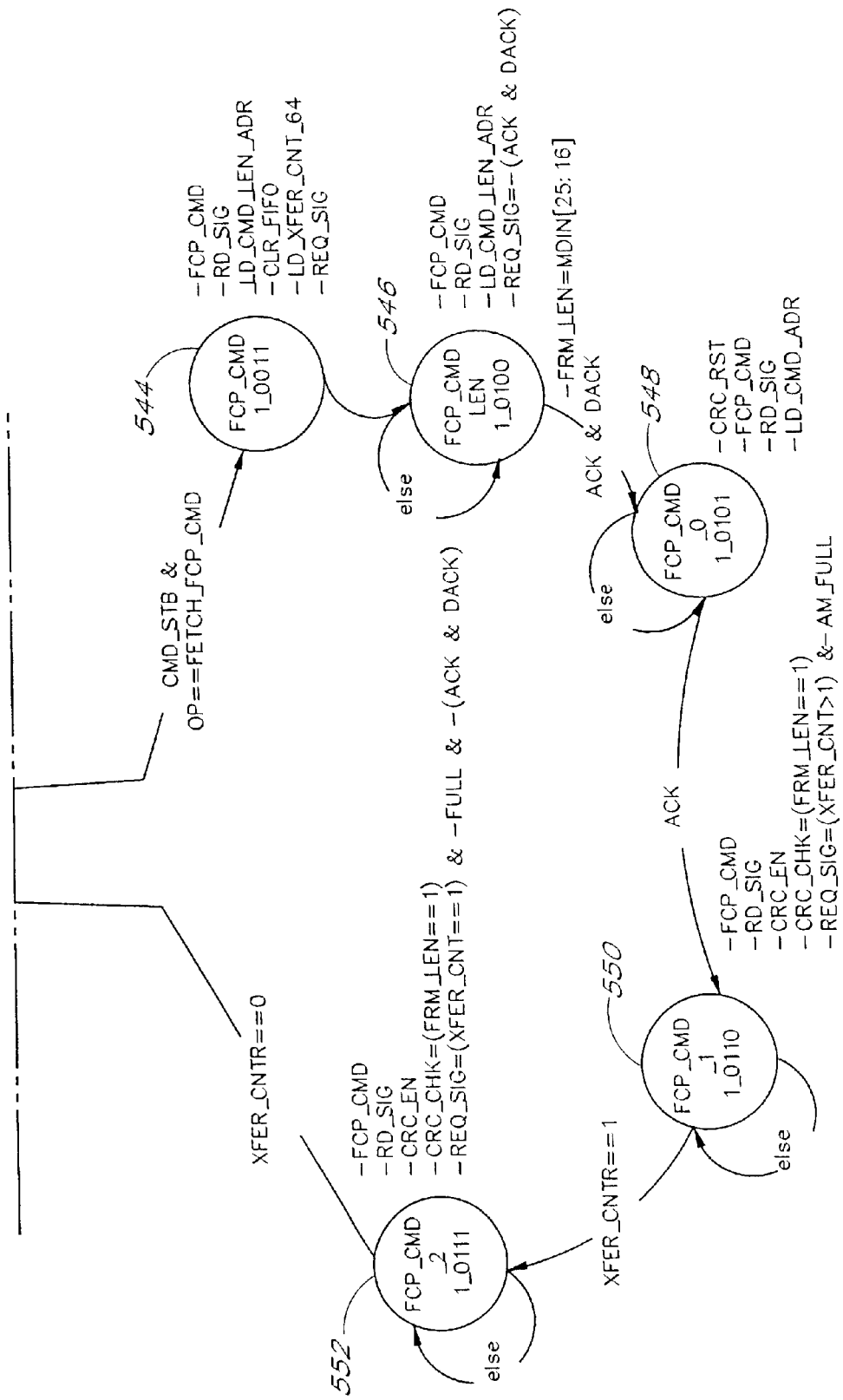

FIG. 4 illustrates in greater detail one embodiment of the MP FIFO 302 with multiple access channels. In one embodiment, the MP FIFO 302 stores up to 64 bytes organized in a 16×32 array 402. Thus, the FIFO array 402 can hold sixteen 32 bit words. In one embodiment, the FIFO array 402 is implemented using dual port asynchronous static RAM elements. One of the two RAM ports is a read port and the other RAM port is a write port. Each of the read and write ports may be separately and independently controlled. The read and write ports may be accessed via one or more interfaces or access ports. In one embodiment the FIFO array 402 is accessible as an internal register file to one or more processors, such as the microcontroller 120. Thus, the FIFO array 402 can be quickly accessed by the microcontroller 120 with little time or management overhead. This contrasts with conventional disk controllers, which access data more slowly from external memory.

As illustrated in FIG. 4, in one embodiment, the MP FIFO 302 includes a buffer memory transfer address register 404, a buffer memory transfer counter 406, a MP FIFO command register 408, a FIFO write pointer 410, a FIFO read pointer 412, a FIFO utilization counter 414, the FIFO access register 416, FCP command fetch address registers 420, 422, and a state machine 418. The aforementioned registers and counters are used to control data transfers to and from the MP FIFO 302. The FIFO array 402 may be memory mapped directly into an internal microcontroller register file. In one embodiment, the registers, counters, and FIFO array 402 are accessible as random access memory by the microprocessor 108 and/or the microcontroller 120. As discussed below, great flexibility in accessing Fibre frames and in locating associated CRC data located at a random FIFO location is thus provided.

In one embodiment, a semaphore is used to avoid conflict between multiple devices, such as the microprocessor 108 and the microcontroller 120, trying to access the FIFO resources. Thus, in one embodiment a register is used to store a semaphore grant bit. Before attempting to use the FIFO 302, or to modify FIFO information, such at the pointers, counters, access register, and the like, a requesting device first attempts to acquire the semaphore.

The MP FIFO command register 408 is used to initiate transfers to or from the buffer memory 112 from or to the MP FIFO 302. A variety of FIFO commands are used to control data transfers between the FIFO 302 and the buffer memory 112. The transfer commands can generally be categorized in four groups. These command groups include load and unload commands, read and write commands, control commands, and automate commands. Some of the commands enable direct frame access to Fibre Channel frames. The load and unload data transfer commands treat the FIFO 302 as a first-in-first-out memory. The load and unload data transfer commands cause the loading and/or unloading of the FIFO 302 using the MP FIFO write pointer 410, the MP FIFO read pointer 412, and the MP FIFO utilization counter 414. In one embodiment, one or more transfer commands are configured to handle transfers greater than the FIFO size.

The read and write data transfer commands treat the FIFO as a random access memory. In one embodiment, the read and write commands read and write data starting at a location zero in the FIFO 302. In another embodiment, the data transfers may begin at other FIFO memory addresses.

The control commands, such as the Clear FIFO command, may be used to clear the FIFO by clearing the associated counters and registers. In addition one or more of the control commands may be used to pause or stop any command currently in progress. The automate commands, such as the Fetch FCP command and the Update Current FCP Command Pointer command, efficiently automate the fetching or transfer of commands, such as Fibre Channel command frames, from the buffer memory 112 or the like, to the FIFO 302. As previously discussed, in one embodiment, the FIFO commands are executed by a state machine.

The FIFO read and write pointers 412, 410 are respectively are used to keep track of the current read and write locations when the FIFO 302 is being accessed in a first-in-first-out manner. The write pointer 410 controls the location or address of a current FIFO write operation. The write pointer 410 contains a byte offset relative to the starting address of the FIFO array 402. In one embodiment, the write pointer 410 is initialized to zero upon a power-on reset or upon receipt of a MP DMA FIFO Reset command. Similarly, the read pointer 412 controls the location or address of a current FIFO read operation. The read pointer 412 contains a byte offset relative to the starting address of the FIFO array 402. In one embodiment, the read pointer 412 is initialized to zero upon a power-on reset or upon receipt of a MP DMA FIFO Reset command.

The FIFO utilization counter 414 is used to keep track of the FIFO utilization count. For example, the FIFO utilization counter 414 may track the amount of FIFO memory locations utilized, and hence, the number of FIFO locations which are not being utilized. In one embodiment, the utilization counter 414 may be read or written to as register by the local microprocessor 108 and/or microcontroller 120. The readable count provides the number of bytes stored in the FIFO array 402. In one embodiment, the number of bytes is rounded down to the nearest word boundary. The FIFO count is decremented as data is read from the FIFO array

402. Thus, in one embodiment, a 4 byte read operation via the access register 416 decrements the count by four when the last of 4 byte is read. Similarly, reading two 16 bit halfwords from the FIFO array 402 decrements the FIFO count by four when the last 16 bit halfword is read. In addition, the FIFO count is decremented by four upon reading a 32 bit word from the FIFO array 402. The data read from the array 402 may be stored in another memory, such as the buffer memory 112.

The MP FIFO access register 416 is used by the microprocessor 108 to read and write data to the FIFO array 402. Thus, data written to the access register 416 is in turn written to the FIFO location indicated by the write pointer 410. The write pointer 410 is typically incremented following such a write access. Similarly, when data is read via the access register 416, the FIFO read counter is incremented. In one embodiment, a varying number of bytes may be read or written via the access register 416. Thus, by example, either one byte or two bytes may be read or written in one operation using the access register 416. SDRAM access to the FIFO array 402 is provided the state machine 418, as discussed below.

The MP FIFO buffer memory transfer address register 404 is used when transferring data to or from the buffer memory 112. The buffer memory transfer address register 404 is loaded with the appropriate buffer memory address before a transfer takes place. The buffer memory transfer counter 406 is used to keep track of the number of bytes transferred to the buffer memory 112. The transfer counter 406 is set to a number corresponding to the amount of data, such as the number of bytes, to be transferred. In one embodiment, the byte count is a multiple of four. Advantageously, the byte count can exceed the size of the FIFO array 402. In one embodiment, the transfer counter may be set to transfer up to 64K bytes. In another embodiment, the transfer counter 406 can be set to a count greater than 64K. Thus, in one embodiment of the present invention, block transfers are not limited to the FIFO size. If the FIFO array 402 becomes full during a transfer of data to the FIFO 302, the transfer is then suspended until data is read out of the FIFO array 402. Similarly, if the FIFO array 402 becomes full during a transfer, the transfer is then suspended until data is loaded in the FIFO array 402.

In one embodiment, a device, such as the microprocessor 108 or the microcontroller 120, can access the FIFO 302 through the MP FIFO access register 416 while the FIFO commands are executing. Thus, for example, the microprocessor or microcontroller can read from the FIFO 302 as the FIFO 302 is being filled. Similarly, the microprocessor 108 or the microcontroller 120 can write to the FIFO 302 as the FIFO is being read or emptied.

The operation of the MP FIFO 302 as a first-in-first-out memory will now be discussed. In one embodiment, writing to the FIFO access register 416 causes the data to be stored at the offset loaded into the write pointer. The write pointer is incremented in a circular fashion each time data is written to the FIFO access register 416. A pause signal is generated when a write operation to the access register 416 is attempted when the utilization counter count equals the FIFO size. This ensures that FIFO data is not overwritten. The pause signal causes the device writing to the FIFO 302, such as the microprocessor 108 or the microcontroller 120, to stall until memory locations are made available. The memory locations may be made available by the performance of a read operation from the access register, which would thereby decrement the utilization count. The pause function permits data transfers to and through the FIFO 302 to be greater than the FIFO size. If the FIFO 302 fills or empties during a write or read process, the process is simply paused, rather than terminated. Thus, the pause function ensures overflow conditions do not occur during data transfers.

In addition, the FIFO memory locations may be made available upon the execution of a FIFO Clear command, which would clear or zero the utilization counter.

Reading the FIFO access register 416 causes the data located at the read pointer offset to be read and increments the read pointer in a circular fashion. The utilization word count is decremented each time a read operation is performed. The pause signal is generated if a read operation from the FIFO access register is attempted when the FIFO utilization count is zero. The pause signal causes the device reading the FIFO 302, such as the microprocessor 108, the microcontroller 120, or the DMA channel, to stall until one or more FIFO memory locations are filled or loaded. The memory locations may loaded by the performance of a write operation from the access register, which would thereby increment the utilization count. Thus, the pause function ensures underflow conditions do not occur during data transfers.

As previously discussed, in one embodiment the MP FIFO array 402 may also be directly and randomly accessed by the microprocessor 108 or microcontroller 120. The static RAM elements used to form the MP FIFO array 402 enable the MP FIFO 302 to be read as a 64 byte random access memory. The array 402 may be mapped into both the microprocessor address space and the microcontroller address space. In one embodiment, reading or writing the MP FIFO 302 as a directly addressable random access array does not affect the MP FIFO registers or counters associated with the first-in-first-out type of operation.

The MP FIFO 302 may also be used for storing microprocessor or microcontroller internal register information during context switching operations. Thus, the microprocessor 108 or microcontroller 120 can quickly swap register file data in and out of the FIFO array 402. The efficient register swapping provided by one embodiment of the present invention advantageously allows the processor to quickly switch tasks.

Context switching allows for disk controller tasks to be performed in a more efficient manner. For example, if, while transferring data from the disk 106 to the Fibre Channel interface 124 using one or more the disk controller processors, such as the microcontroller 120, the transfer outpaces the disk's ability to supply data, it would be more efficient for the microcontroller to perform some other task during this period, rather than wastefully pausing until the disk 106 catches up. By way of example, it would be advantageous to send cache data to a different host, while waiting for additional disk data to accrue. Thus, one embodiment of the present invention allows the context of one operation to be saved in the FIFO 302 while another task is performed. Context switching can be performed especially quickly with one embodiment of the present invention, as the FIFO array 402 is accessible as an internal register file of the microcontroller 120. The microcontroller 120 can therefore quickly swap context information into and out of the FIFO array 402. Thus, the context does not have to be stored in slower secondary memory, such as the buffer memory 112. Depending on the size of the FIFO array 402 and the amount of context data, the FIFO array 402 may be used to store multiple contexts at the same time.

The context information may include relevant information used to keep track of a task, such as frame counts, sequence counts, transfer counts, and the like. Thus, in one embodiment, if a transfer runs out of available data, the transfer operation may be suspended, and the context of the operation may be stored in the FIFO 402. Depending on the size of the cache data, the context may be changed several times.

The stored context may be restored using a variety of techniques. For example, the stored context may be restored once additional data is available for the suspended transfer. The restored context can overwrite an existing context, if no longer needed. Using another technique, a context can be swapped back into FIFO 402, and the replaced context can be swapped out of the FIFO 402 at the same time.

Referring to FIG. 3, an SDRAM controller 304 and an arbiter module 306 are used in accessing the buffer memory 112. The arbiter 306 selects a requester when multiple requests are active, and establishes an access tenure. The arbiter 306 then grants the requester an access turn. The SDRAM controller 304 then proceeds to move data between the buffer memory 112 and the buffer controller data bus.

As previously discussed, special commands are provided to facilitate access to the data stored in the MP FIFO 302. In one embodiment, the FIFO state machine 418 accepts and performs the commands, listed in Table 2 below.

In one embodiment, a transfer is initiated upon writing a command to the command register 408. A MP DMA FIFO Command Active bit is set in a status register to indicate that a FIFO command is in the process of being executed. Table 1 below illustrates one embodiment of the bit assignment for the command register 408.

TABLE 1

| Bit Position | Name |
| --- | --- |
| 15-8 | Reserved |
| 7 | Interrupt When Complete |
| 6 | Select FCP CMD 2 |
| 5 | Swap Halfword In Words |
| 4 | Swap Bytes in Halfwords |
| 3-0 | Command |

Referring to Table 1, bits 15-8 of the command register 408 are reserved. When the LBA (logical block address) format bit (8) is set, a CRC hardware accumulator is initialized with the inverted LBA as the seed. Otherwise the CRC accumulator will just use the seed, which, in one embodiment, is all ones. In one embodiment, the use of a dedicated, hardware CRC accumulator permits the CRC to be quickly calculated without loading down the processors with this task.

Commands loaded into the command register 408 may cause an interrupt signal to be generated. In one embodiment, an interrupt is generated when a command is completed and the Interrupt When Complete bit (7) is set in the command register 408. A Command Active bit is set in the status register while a command is still active. In addition, a Command Complete bit may be set in the status register upon completion of a command. In one embodiment, the interrupt may go to a processor, such as the microcontroller 120 or microprocessor 108. The receiving processor may mask the interrupt, or pass the interrupt on to another processor or to the host 104.

A descriptions of bits 6-4 will be later described. Table 2, below, illustrates the operations defined by 3-0 of the command register 408.

TABLE 2

| Operation |
| --- |
| Clear FIFO |
| Stop FIFO |
| Load FIFO |
| Unload FIFO |
| Load FIFO with BCRC check |
| Unload FIFO with BCRC Generation |
| Read from Buffer Memory |
| Write to Buffer Memory |
| Fetch FCP Command |
| Update Current FCP Command pointer |

The Clear FIFO command sets or clears the FIFO read and write pointers 412, 410 to zero. In one embodiment, the contents of the FIFO array 402 are unaltered by the Clear FIFO command. In one embodiment, the Clear FIFO command may be issued while other commands are active.

The Stop FIFO command stops any active FIFO command and resets the FIFO state machine 418. In one embodiment, the Stop FIFO command may be issued while other commands are active. In one embodiment, the contents of the pointers 410, 412 and the FIFO array 402 are unaltered by the Stop FIFO command.

The Load FIFO command transfers data from the buffer memory 112 to the MP FIFO 302. The data is loaded into the FIFO array 402 starting at the location defined by the MP FIFO write pointer 410. The number of bytes to be transferred is set in the Buffer Memory transfer counter 406. The buffer memory start address for the transfer is set in the buffer transfer address register 404. Advantageously, the number of bytes to be transferred is allowed to exceed the size of the FIFO array 402. Thus, transfers can be of any desired size. In one embodiment, the transfer counter is sized to manage transfers up to 4 Kbytes in size, as compared to the 64 byte FIFO array size. However, the transfer counter can be sized to handle larger or smaller transfers, as desired.

In one embodiment, 4 Kbytes may be transferred as a result of one Load command. The Load FIFO operation will be suspended if the FIFO 302 is full and the transfer is incomplete. An MP DMA FIFO Full bit is set in the status register is set to indicate the FIFO array 402 is full. The transfer may resume automatically when the FIFO 302 begins to empty and the MP DMA FIFO Full bit is cleared.

Figure 8:
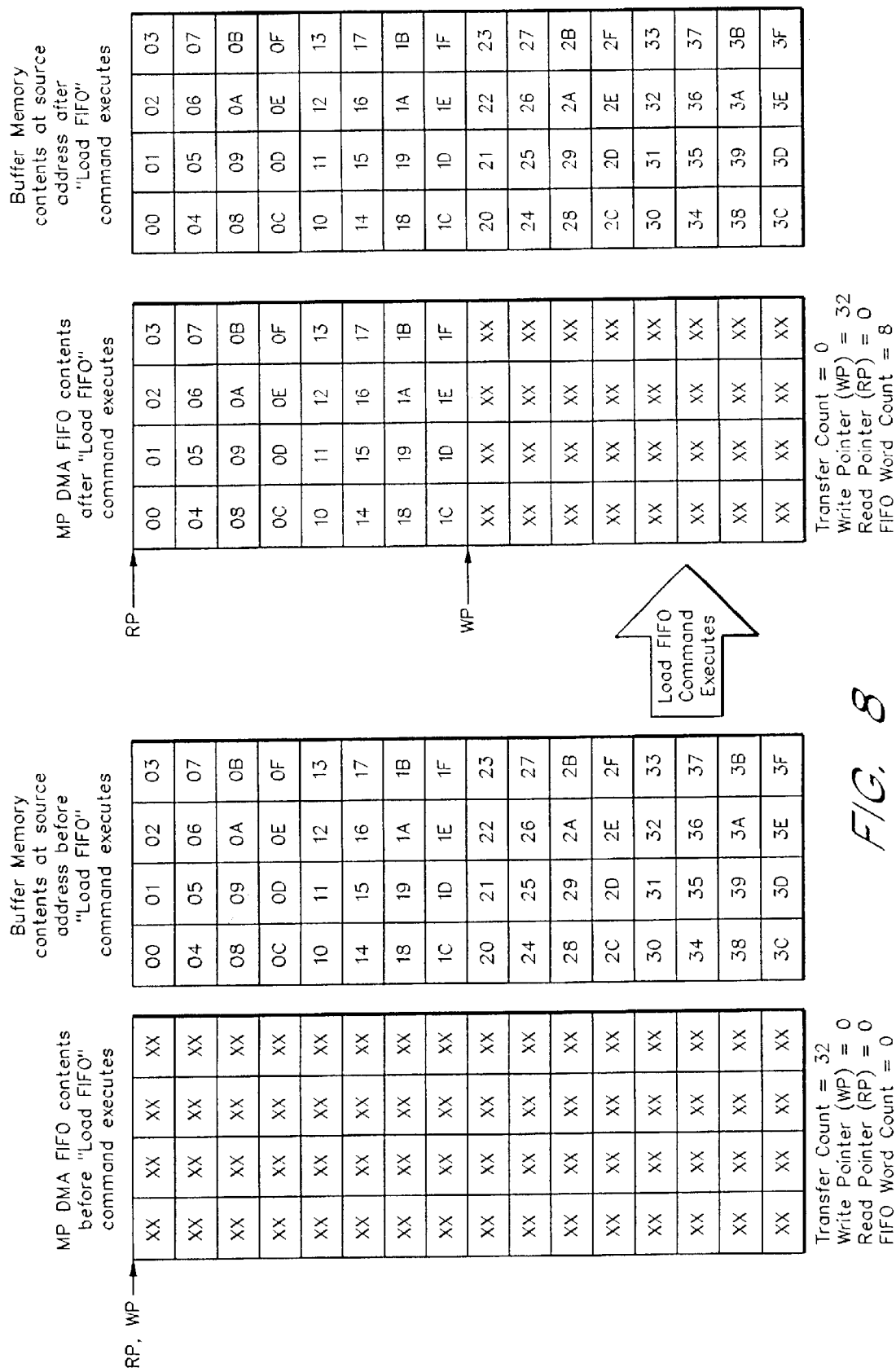
FIG. 8 is an illustration of a first exemplary data transfer.

FIG. 8 illustrates one example of a Load FIFO command operation. The FIFO array 402 is assumed to contain "don't care" information, designated by "xx". The write pointer (WP) 410 and read pointer (RP) 412 are set to "0," thereby pointing to the physical beginning address of the FIFO array 402. When the read pointer 412 points to the same address as the write pointer 410, the FIFO 402 is either empty or full, depending on the utilization count. The FIFO word count, indicating how many FIFO word locations have been used, is at "0," indicating the FIFO 402 is empty. The Buffer Memory transfer counter 406 is loaded with "32", indicating 32 bytes are to be transferred from the buffer memory 112 to the FIFO array 402. For clarity, in the present example, the buffer memory 112 is loaded with sequential numbers, though, in one embodiment, the actual buffer memory contents does not affect the operation of the Load FIFO command.

Once the Load FIFO command is received by the command register 408, the transfer of 32 bytes from the buffer memory 112 to the FIFO array 402 takes place. The buffer memory data is written to the FIFO 302 beginning at the location indicated by the write pointer 410, in this example "0". The write pointer 410 is incremented as each byte is transferred and loaded into the FIFO array 402. This process repeats until the number of bytes specified by the transfer count, in this example 32, is transferred. As illustrated in FIG. 8, once the Load FIFO command is complete, the FIFO array 402 contains the transferred data, the write pointer 410 has been incremented to 32, the read pointer 412 remains at 0, and the FIFO word count is at 8. In one embodiment, the transferred data also remains in the buffer memory 112.

The Unload FIFO command transfers data from the MP FIFO 302 to the buffer memory 112. The data is unloaded from the FIFO array 402 starting at the location defined by the MP FIFO read pointer 412. The number of bytes to be transferred is set in the Buffer Memory transfer counter 406. The buffer memory start destination address for the transfer is set in the buffer transfer address register 404. As with the Load command, the number of bytes to be transferred is allowed to exceed the size of the FIFO array 402. The Unload FIFO operation will be suspended if the FIFO 302 is empty and the transfer is incomplete. An MP DMA FIFO Not Empty bit is cleared in the status register is set to indicate the FIFO array 402 is empty. The transfer may resume when the FIFO 302 begins to fill and the MP DMA FIFO Not Empty bit is set.

Figure 9:
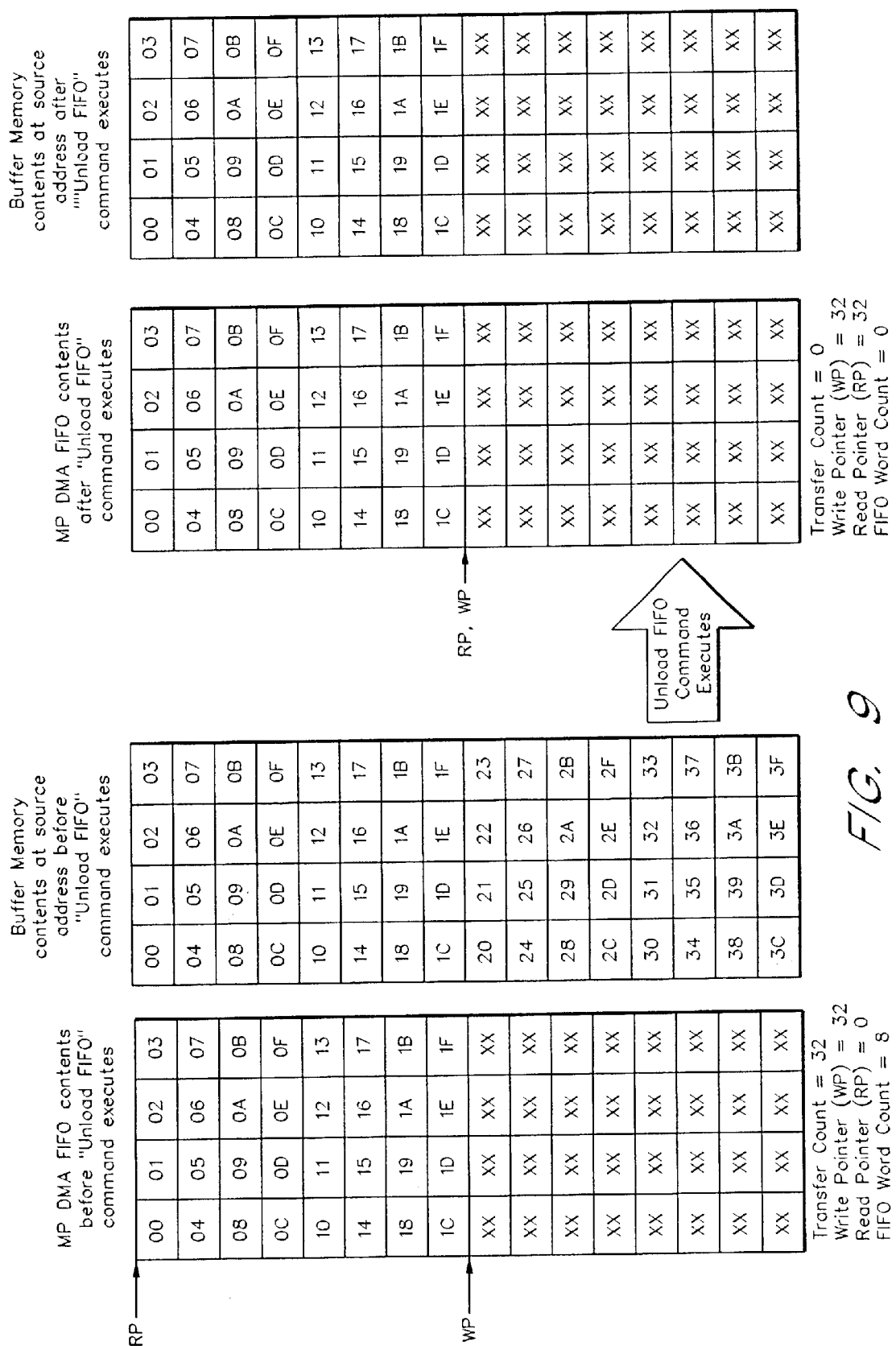
FIG. 9 is an illustration of a second exemplary data transfer.

FIG. 9 illustrates one example of an Unload FIFO command operation. The write pointer (WP) 410 is currently set to "32" and the read pointer (RP) 412 is set to "0". The FIFO word count, indicating how many FIFO word locations have been used, is at "8," indicating that there are 8 words in the FIFO array 402. The Buffer Memory transfer counter 406 is loaded with "32", indicating 32 bytes are to be transferred from the FIFO array 402 to the buffer memory 112. For clarity, in the present example, the FIFO array 402 is loaded with sequential numbers, though the actual buffer memory contents does not affect the operation of the Unload FIFO command.

Once the Unload FIFO command is received by the command register 408, the transfer of 32 bytes from the FIFO array 402 to the buffer memory 112 takes place. The data is read out of the FIFO 302 beginning at the location indicated by the read pointer 412, in this example "0". The read pointer 412 is incremented by 4 as each word is transferred and loaded into the buffer memory 112. This process repeats until the number of bytes specified by the transfer count, in this example 32, is transferred. As illustrated in FIG. 9, once the Unload FIFO command is complete, the buffer memory 112 contains the transferred data, the write pointer 410 remains at 32, the read pointer 412 is has been incremented to 32, and the FIFO word count is at 0, indicating that the FIFO is empty. In one embodiment, even though the FIFO array 402 is empty, the data has not been erased from the FIFO array 402.

The Load FIFO with BCRC (Block CRC) Check command transfers data from the buffer memory 112 to the MP FIFO 302 while performing a CRC check. This command is especially useful for transferring disk sectors with associated sector CRCs. The data is loaded into the FIFO array 402 starting at the location defined by the MP FIFO write pointer 410. The number of bytes to be transferred is set in the Buffer Memory transfer counter 406. The buffer memory start source address for the transfer is set in the buffer transfer address register 404. The number of bytes to be transferred is allowed to exceed the size of the FIFO array 402. The Block CRC, which in one embodiment is the last word to be transferred, is checked. If the CRC check indicates that the Block CRC is valid, an MP DMA FIFO CRC Good bit is set in the status register. The Load FIFO with BCRC Check operation will be suspended or paused if the FIFO 302 is full and the transfer is incomplete. The transfer may resume automatically when the FIFO 302 begins to empty.

The pause feature is particularly advantageous for transferring large data blocks greater is size than the FIFO 302, with an associated error detection and/or correction code, from the buffer memory 112. The error detection code may be, by way of example, a CRC. Using conventional techniques, the transfer of data blocks larger than the FIFO array 402 may be disadvantageously performed by treating the large block as several smaller blocks, equal in size to the FIFO array 402. Thus, the large block would be transferred as a series of smaller, separate, transfers. However, this conventional technique can make the calculation of the CRC, which is for the entire block, difficult or slow to perform by requiring reseeding of the CRC accumulator at the start of each FIFO-sized transfer. In contrast, one embodiment of the present invention permits the entire block to be treated as one block, with the CRC accumulated over the course of the transfer, without reseeding.

Figure 10:
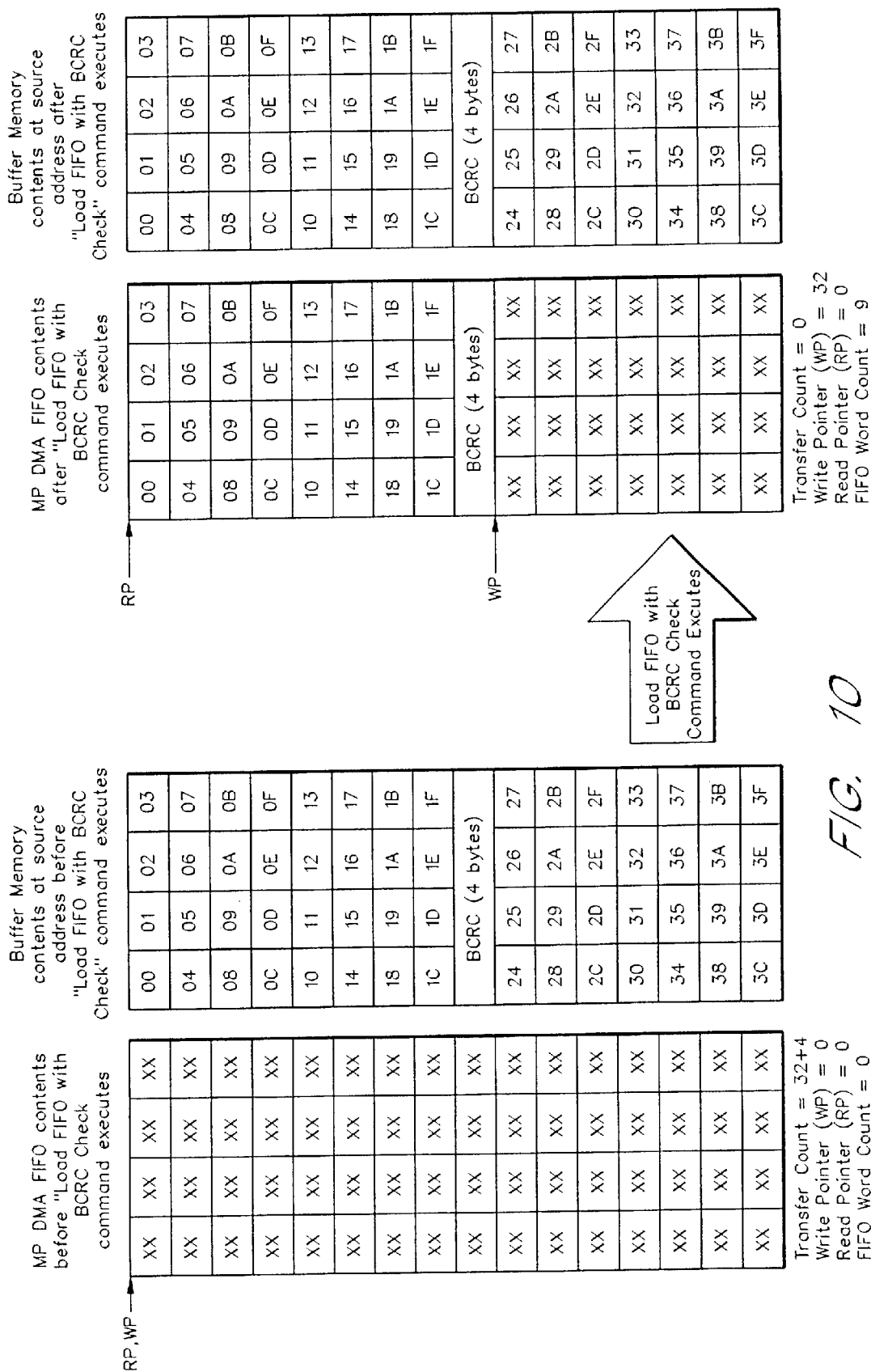
FIG. 10 is an illustration of a third exemplary data transfer.

FIG. 10 illustrates one example of a Load FIFO with BCRC Check command operation. The FIFO array 402 is assumed to contain "don't care" information, designated by "xx". The write pointer (WP) 410 and read pointer (RP) 412 are set to "0," thereby pointing to the physical beginning address of the FIFO array 402. The FIFO utilization word count is at "0," indicating the FIFO array 402 is empty. The Buffer Memory transfer counter 406 is loaded with "32+4" or 36, indicating 36 bytes, including 32 data bytes and 4 BCRC bytes, are to be transferred from the buffer memory 112 to the FIFO array 402. For clarity, in the present example, the buffer memory 112 is loaded with sequential numbers, though, in one embodiment, the actual buffer memory contents does not affect the operation of the Load FIFO with BCRC Check command.

Once the Load FIFO with BCRC Check command is received by the command register 408, the transfer of 32 data bytes and 4 BCRC bytes from the buffer memory 112 to the FIFO array 402 takes place. The buffer memory data and BCRC is written to the FIFO 302 beginning at the location indicated by the write pointer 410, in this example "0". The write pointer 410 is incremented as each byte is transferred and loaded into the FIFO array 402. This process repeats until the number of bytes specified by the transfer count, in this example 36, is transferred. The BCRC is checked during the transfer, and if the CRC check indicates that the CRC is valid, the MP DMA FIFO CRC Good bit is set in the status register. As illustrated in FIG. 10, once the Load FIFO with BCRC Check command is complete, the FIFO array 402 contains the transferred data, the write pointer 410 has been incremented to 36, the read pointer 412 remains at 0, and the FIFO word count is at 9. In one embodiment, the transferred data also remains in the buffer memory 112.

The Unload FIFO with BCRC Generation command transfers data from the MP FIFO 302 to the buffer memory 112 while generating a Block CRC. The transfer begins starting at the location defined by the MP FIFO read pointer 412. The number of bytes to be transferred is set in the Buffer Memory transfer counter 406. The buffer memory start destination address for the transfer is set in the buffer transfer address register 404. The last word to be transferred is a dummy word and is replaced with a block CRC calculated by the CRC engine 132. The number of bytes to be transferred is allowed to exceed the size of the FIFO array 402. The Unload FIFO with BCRC Generation operation will be suspended or paused if the FIFO 302 is empty and the transfer is incomplete. The transfer may resume automatically when the FIFO 302 begins to fill.

Figure 11:
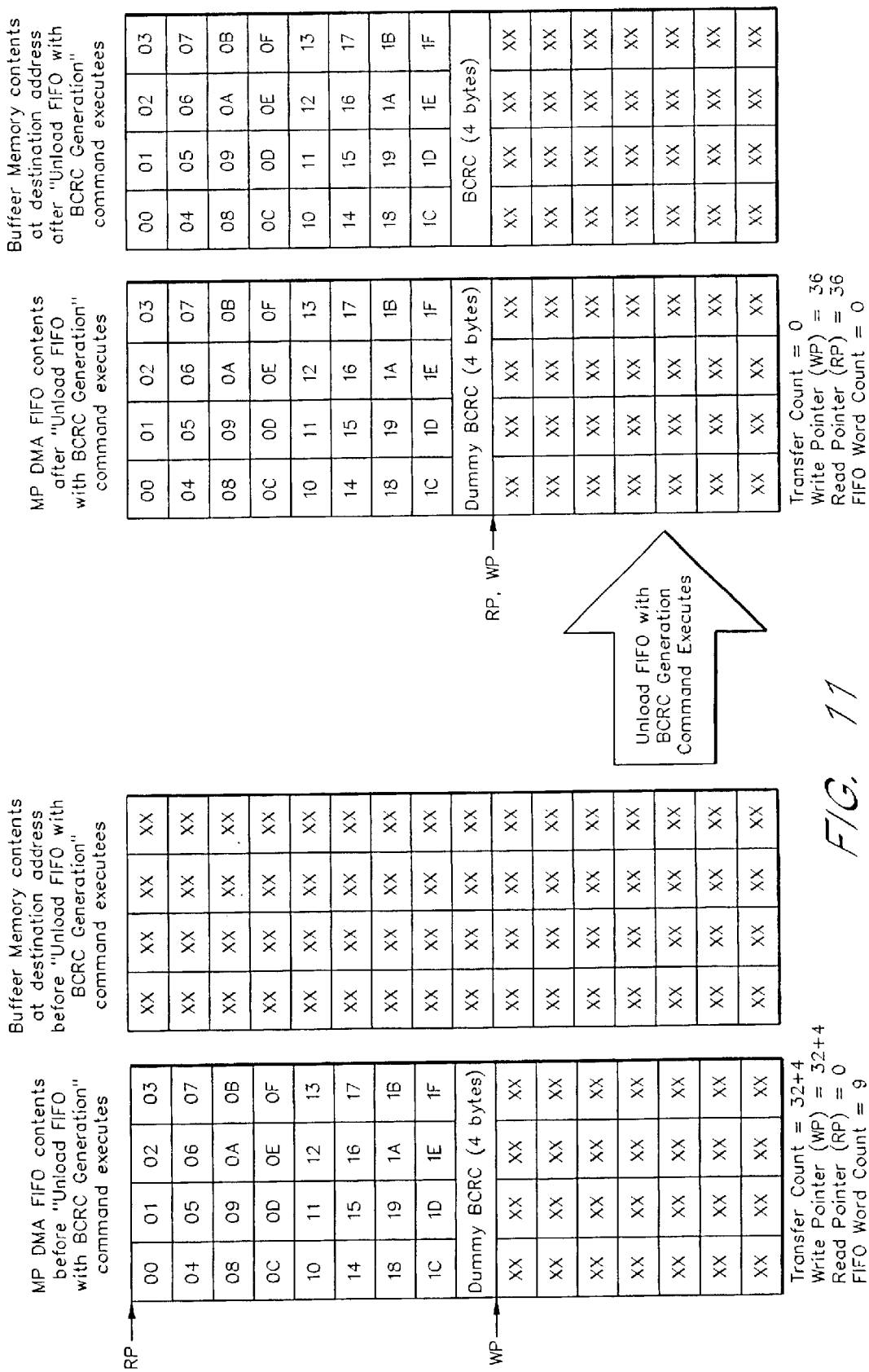
FIG. 11 is an illustration of a fourth exemplary data transfer.

FIG. 11 illustrates one example of an Unload FIFO with BCRC Generation command operation. The buffer memory 112 is assumed to contain "don't care" information, designated by "xx". For clarity, in the present example, the FIFO array 402 is loaded with 32 bytes of sequential numbers. In addition, the 4 bytes following the data "contain" a dummy BCRC. That is, the BCRC for the 32 data bytes at FIFO addresses 0–31 has not been calculated yet, but for FIFO management purposes, the write pointer 410 is set to 36, as if address locations 32–35 contained an actual BCRC. The read pointer (RP) 412 is set to "0". The FIFO utilization word count, indicating how many FIFO word locations have been used, is at "9," indicating that there are 9 words in the FIFO array 402. The Buffer Memory transfer counter 406 is loaded with "32+4," or 36, indicating 36 bytes are to be transferred from the FIFO array 402 to the buffer memory 112.

Once the Unload FIFO with BCRC Generation command is received by the command register 408, the transfer of 32 bytes from the FIFO array 402 to the buffer memory 112 takes place. The data is read out of the FIFO 302 beginning at the location indicated by the read pointer 412, in this example "0". The read pointer 412 is incremented as each word is transferred and loaded into the buffer memory 112. The BCRC is continuously calculated during this transfer. This process repeats until the number of bytes specified by the transfer count, minus the 4 bytes for the BCRC data, is transferred. In this example, 32 bytes are transferred from the array 402. The last 4 bytes transferred to the buffer memory 112 contains the BCRC data, supplied by the CRC accumulator rather than the FIFO array 402. As illustrated in FIG. 11, once the Unload FIFO with BCRC Generation command is complete, the buffer memory 112 contains the transferred data with the associated BCRC. The write pointer 410 remains at 36, the read pointer 412 has been incremented to 36, and the FIFO word count is at 0, indicating that the FIFO is empty. In one embodiment, even though the FIFO array 402 is empty, the data has not been erased from the FIFO array 402.

The Read from Buffer Memory command transfers data 64 bytes of data from the buffer memory 112 to the MP FIFO 302. The data is loaded into the FIFO array 402 starting at the beginning or zero address of the FIFO array 402. The buffer memory start source address for the transfer is set in the buffer transfer address register 404. In one embodiment, the read pointer 412 and the transfer counter 406 are automatically initialized using default values. Thus, rather than having to go through a lengthy setup process, one command quickly initializes the counters. In addition, in one embodiment, no CRC check is performed. Thus, the Read from Buffer Memory command, which automatically loads 64 bytes at the start of the FIFO array 302, allows sequential pages to be quickly loaded without having the overhead time associated with managing the FIFO pointers. This command permits a processor, such as the microprocessor 108 or the microcontroller 120, to quickly perform FIFO loads to examine data stored in the buffer memory at 64 byte intervals. In one embodiment, no CRC is performed during this transfer.

Figure 13:
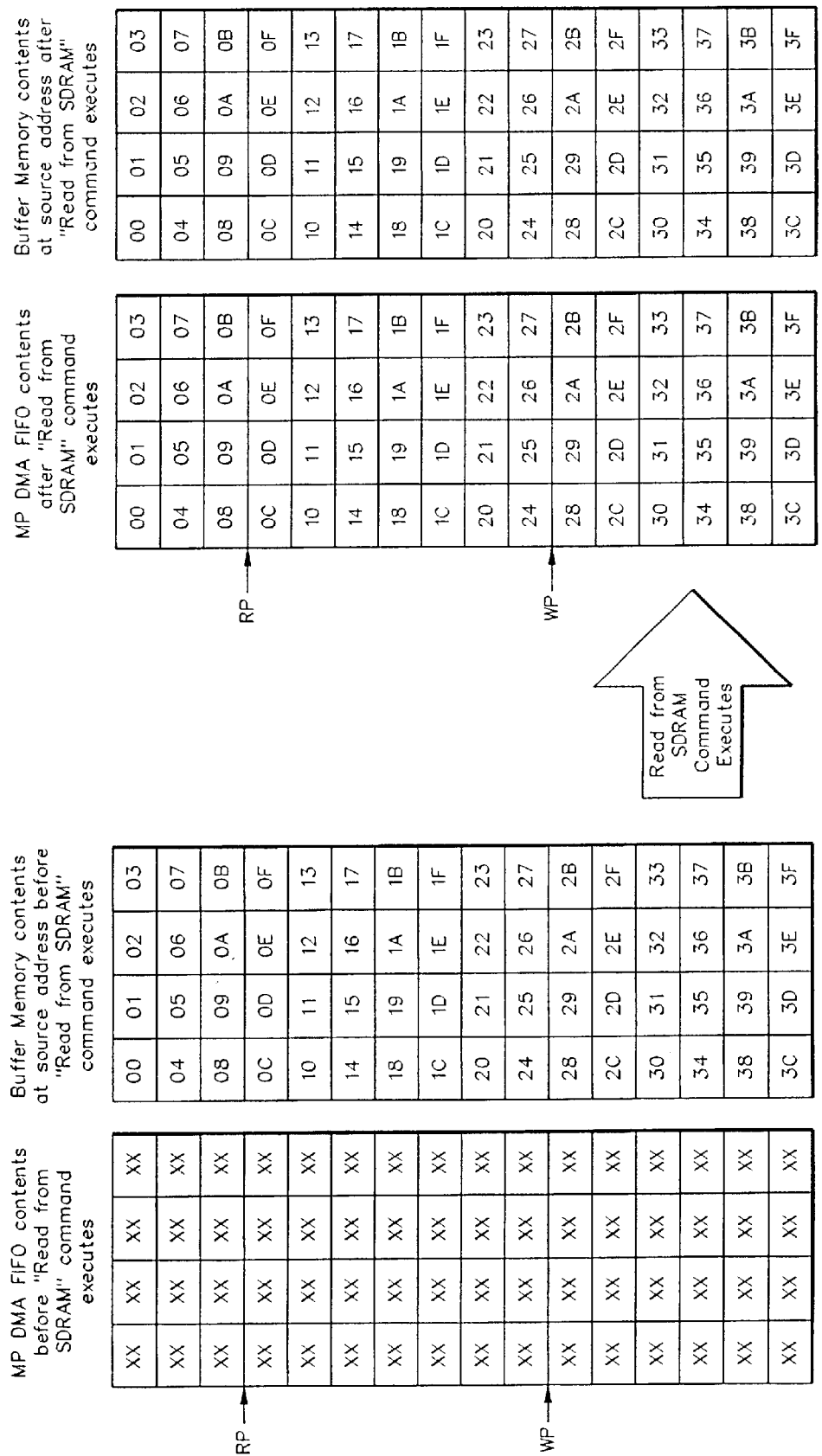
FIG. 13 is an illustration of a sixth exemplary data transfer.

FIG. 13 illustrates one example of a Read from Buffer Memory command operation. The FIFO array 402 is assumed to contain "don't care" information, designated by "xx". The write pointer (WP) 410, read pointer (RP) 412, transfer counter 406, and word count, based on the utilization counter 414, are automatically initialized with default values. For clarity, in the present example, the buffer memory 112 is loaded with sequential numbers, though, in one embodiment, the actual buffer memory contents does not affect the operation of the Read from Buffer Memory command.

Once the Read from Buffer Memory command is received by the command register 408, the automatic transfer of 64 bytes from the buffer memory 112 to the FIFO array 402 takes place. The buffer memory data is written to the FIFO array 402 beginning at first FIFO memory location. All 64 bytes are transferred. As illustrated in FIG. 13, once the Read from Buffer Memory command is complete, the FIFO array 402 contains the transferred data. In one embodiment, the transferred data also remains in the buffer memory 112.

The Write to Buffer Memory command transfers the entire 64 byte content of the FIFO array 402 to the buffer memory 112. The data is loaded into the FIFO array 402 starting at the beginning or zero address of the FIFO array 402. The buffer memory start destination address for the transfer is set in the buffer transfer address register 404. In one embodiment, the Write to Buffer Memory command does not use the write pointer 410, the read pointer 412, or the transfer counter 406. Thus, the Write from Buffer Memory command, which automatically unloads 64 bytes at the start of the FIFO array 302, allows sequential pages to be quickly transferred to the buffer memory 112 without having the overhead time associated with managing the FIFO pointers. In one embodiment, no CRC is performed during these transfers.

Figure 14:
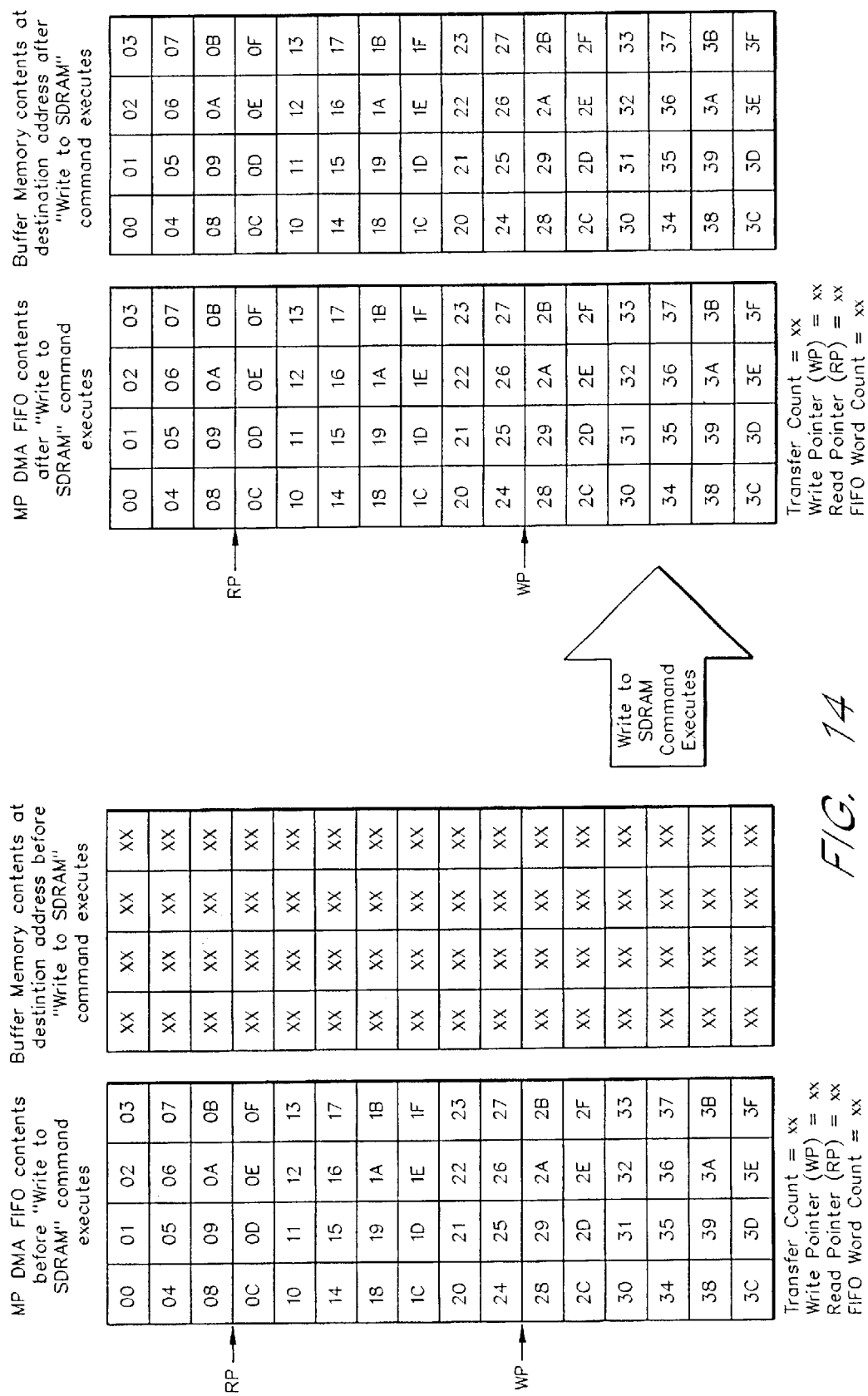
FIG. 14 is an illustration of a seventh exemplary data transfer.

FIG. 14 illustrates one example of a Write to Buffer Memory command operation. The buffer memory 112 is assumed to contain "don't care" information, designated by "xx". The write pointer (WP) 410, read pointer (RP) 412, transfer counter 406, and utilization counter 414 are automatically initialized to default values. For clarity, in the present example, the FIFO array 402 is loaded with sequential numbers, though, in one embodiment, the actual contents do not affect the operation of the Write to Buffer Memory command.

Once the Write to Buffer Memory command is received by the command register 408, the automatic transfer of 64 bytes from the FIFO array 402 to the buffer memory 112 takes place. The 64 bytes of FIFO data is automatically written to the buffer memory 112 beginning at the address stored in the buffer transfer address register 404. As illustrated in FIG. 14, once the Write to Buffer Memory command is complete, the buffer memory 112 contains the transferred data, and the write pointer 410 and the read pointer 412 are unaltered. In one embodiment, the transferred data also remains in the FIFO array 402.

The Select FCP (Fibre Channel Protocol) CMD 2 bit (6) is used in conjunction with the Fetch Current FCP command and the Update Current FCP Command Pointer command. When the Fetch Current FCP command is executed, the current FCP command is transferred from the command buffer in the buffer memory 112 to the MP FIFO array 402. In one embodiment, this transfer is performed automatically, without processor intervention, once the FIFO command is written to the command register 408.

As discussed in greater detail below, the state machine 418 executes the Fetch Current FCP command by executing a Clear FIFO sequence, clearing the pointers and utilization counter, and then copying the FCP Command Fetch Address to the MP FIFO buffer memory transfer address register 404. The Select FCP CMD 2 bit (6) determines which of the two fetch addresses, FCP Command 1 Fetch Address or FCP Command 2 Fetch Address, will be used to fetch the current FCP command. The provision of two fetch addresses, FCP Command 1 Fetch Address or FCP Command 2 Fetch Address, advantageously allow two command buffers to be present in the buffer memory 112. The FCP Command 1 Fetch Address and FCP Command 2 Fetch Address are correspondingly stored in the FCP Command 1 Fetch Address register 420 and the FCP Command 2 Fetch Address register 422. The registers 420, 422 contain the corresponding FCP Command Frame Table base, FCP Command fetch address frame pointer, and 64 byte command frame start.

The state machine 418 then sets the MP FIFO buffer memory transfer counter 406 to 60, which is the size, in bytes, of an FCP command, excluding the associated CRC and buffer length field. The buffer length field is loaded into the MP FIFO 302 beginning at the top, or zero address location, of the FIFO array 402. Thus, the buffer length field may be quickly and automatically located for use by processing elements, such as the microcontroller 120. In one embodiment, the buffer length field is at a fixed location or spacing relative to the FCP command header. The buffer length field may be used to locate the CRC, which is checked to determine if the frame is corrupted. In one embodiment, the FCP command frame is stored in the buffer memory 112 with the CRC located above the buffer length field, as illustrated in FIG. 7. A Load FIFO with BCRC Check command is then automatically executed. In one embodiment, the Interruption Upon Complete bit is set as well.

Thus, by having the state machine automatically perform the complex task of reading in and checking an FCP command without requiring further microprocessor or microcontroller intervention, the processing burden of the microprocessor 108 and the microcontroller 120 is greatly reduced. In addition, the reading of the FCP command is accomplished more quickly and efficiently.

The Update Current FCP Command Pointer command performs the steps needed to advance a Current Command Fetch address counter or register. First, the Fetch Address pointer is incremented by the command size, which is 64. The Select FCP CMD 2 bit (6) determines which of the FCP Command 1 Fetch Address and FCP Command 2 Fetch Address will be used. The MP FIFO command complete interrupt is then generated. The Command count is then decremented.

Figure 12:
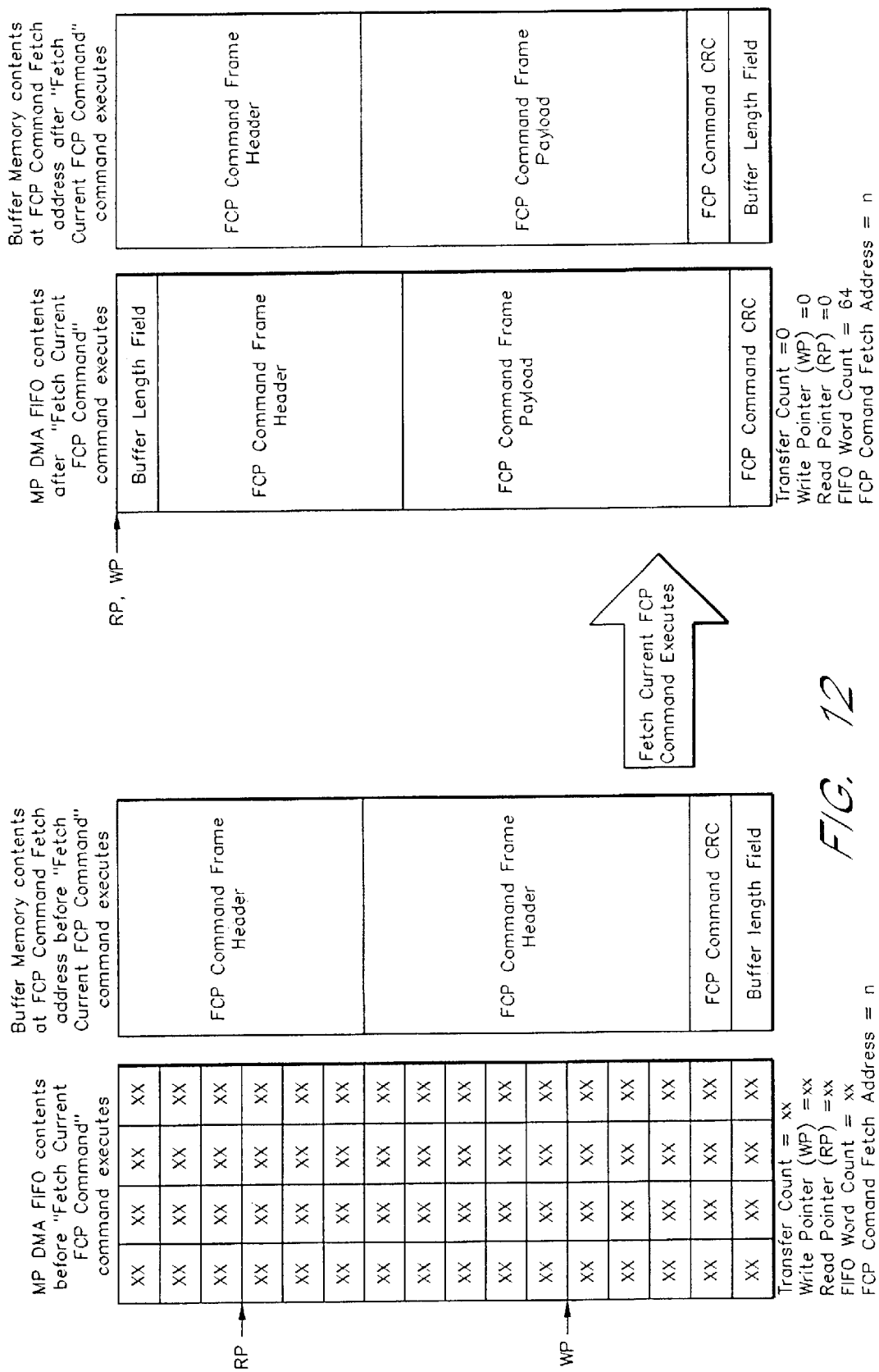
FIG. 12 is an illustration of a fifth exemplary data transfer.

FIG. 12 illustrates one example of a Fetch Current FCP command operation. The FIFO array 402 is assumed to contain "don't care" information, designated by "xx". The write pointer (WP) 410, read pointer (RP) 412, and word count are also "don't cares." The buffer memory 112 is loaded with an FCP Command frame, including 6 words for the frame header, 8 words for the frame payload, 1 word for the FCP Command CRC, and a 1 word buffer length field, for a total of 64 bytes.

Once the Fetch Current FCP command is received by the command register 408, the automatic transfer of 64 bytes from the buffer memory 112 to the FIFO array 402 takes place. The transfer is from the buffer memory location indicated by the corresponding FCP Command Fetch Address. First, the buffer length field is automatically loaded at the beginning or top address of the FIFO array 402. Thus, the buffer length field will be the first word later unloaded from the FIFO array 402. The FCP Command Frame header is then transferred, followed by the frame payload and the CRC, which is checked. As illustrated in FIG. 12, once the Fetch Current FCP command is complete, the FIFO array 402 contains the transferred data, with the buffer length field on top. The write pointer 410 and the read pointer 412 remain at 0, and the FIFO word count is at 64, indicating the FIFO array 402 is full.

Figure 15:
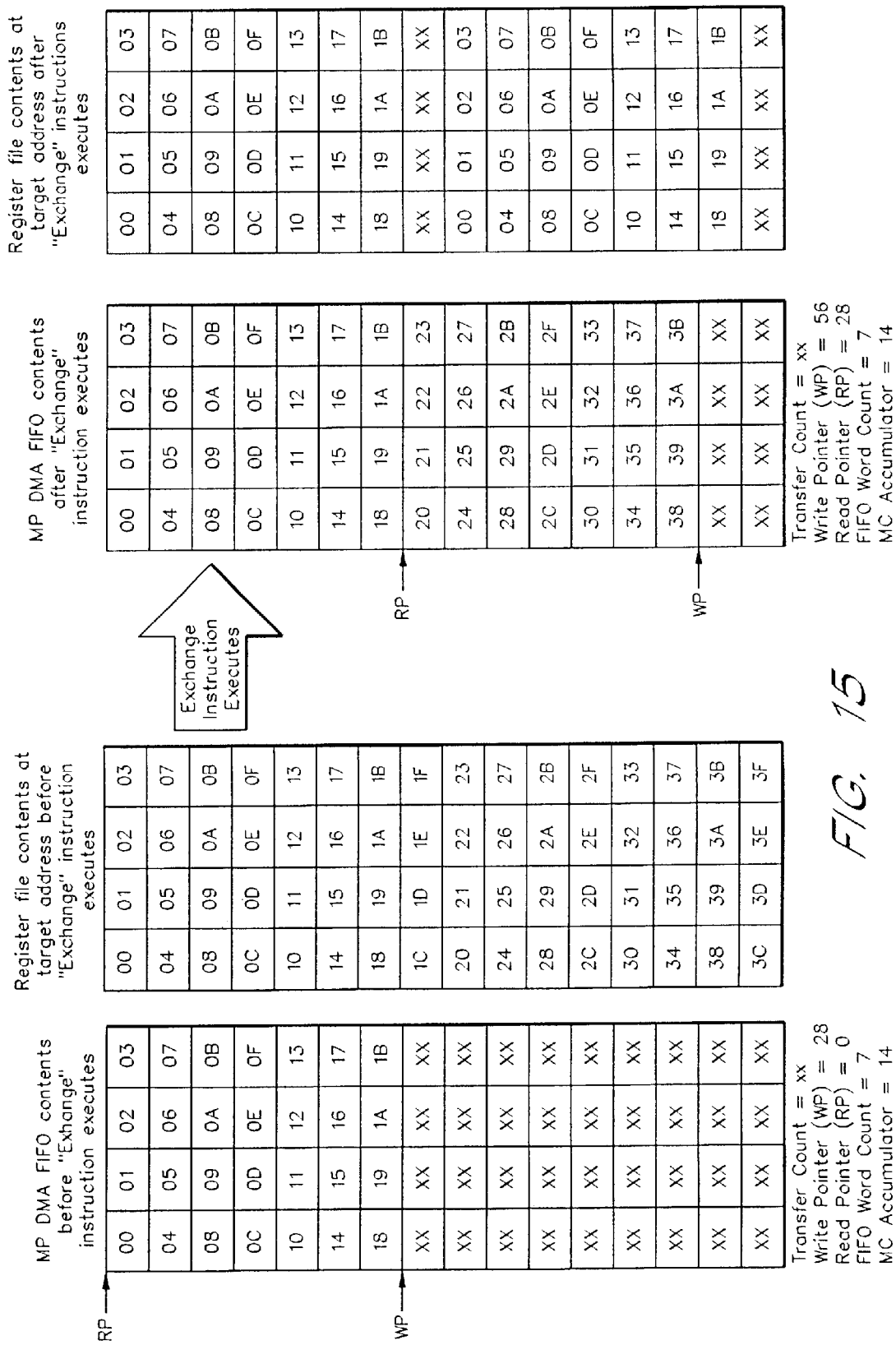
FIG. 15 is an illustration of an eighth exemplary data transfer.

FIG. 15 illustrates one embodiment of a context switching operation. This example illustrates swapping or transferring a context previously stored in the FIFO array 402 to an exemplary register file, while transferring the context from the register file to the FIFO array 402. The register file may be one of any number of register files, and may be used to contain a variety of data or contexts, such as an FCP header, a transfer count status, and so on. In the present example, the FIFO array 402 contains a first context stored in the first 28 bytes of the array. The remainder of the array 402 is assumed to contain "don't care" information, designated by "xx". The write pointer (WP) 410 is at 28, that is, the write pointer 410 will cause the next data received by the FIFO array 402 to be written in the memory location following the first context. The read pointer (RP) 412 is set to "0," thereby pointing to the physical beginning address of the FIFO array 402. The FIFO utilization word count, indicating how many FIFO word locations have been used, is at "7." The microcontroller (MC) accumulator is set to "14." The Buffer Memory transfer counter 406 is a "don't care," as data is not being transferred to or from the buffer memory 112 in this operation. The register file 1502 contains a second context, including 28 bytes. While, in this example, the first and second contexts are the same size, they could have different sizes as well. For clarity, in the present example, the FIFO array 402 is loaded with sequential numbers 00-1B, while the register file 1502 is loaded with sequential numbers 20-3B.

An MC Exchange Load FIFO command is used to perform context switching or swapping. Once an MC EXCHANGE Load FIFO command is issued, the context stored in the FIFO array 402 is swapped with the context stored in the register file 1502. In the illustrated example, the first context is swapped out, but also is not erased from the FIFO array 402. However, if desired, the first context could be overwritten in the FIFO array 402 during a swap operation, while the swapped out copy of the first context would be stored in the register file 1502. For example, if the context being swapped in was larger than the unused FIFO locations, all or part of the first context stored in the FIFO array 402 may be overwritten. Thus, in one embodiment, if the context being swapped in from the register file is 64 bytes, the first context in the FIFO array 402 would be completely overwritten.

As illustrated in FIG. 15, in this example, the context transferred from the register file 1502 to the FIFO array 402 is stored immediately after the first context. The register file 1502 now contains the first context. The write pointer (WP) 410 has advanced to 56, reflecting the additional data written to the FIFO array 402. The read pointer (RP) 412 has advanced to 28, reflecting the fact that 28 bytes have been read from the array 402. The FIFO word count remains at 7, as the same number of words were read out of the array 402 as were written to the array 402 during the swap.

Figure 6:
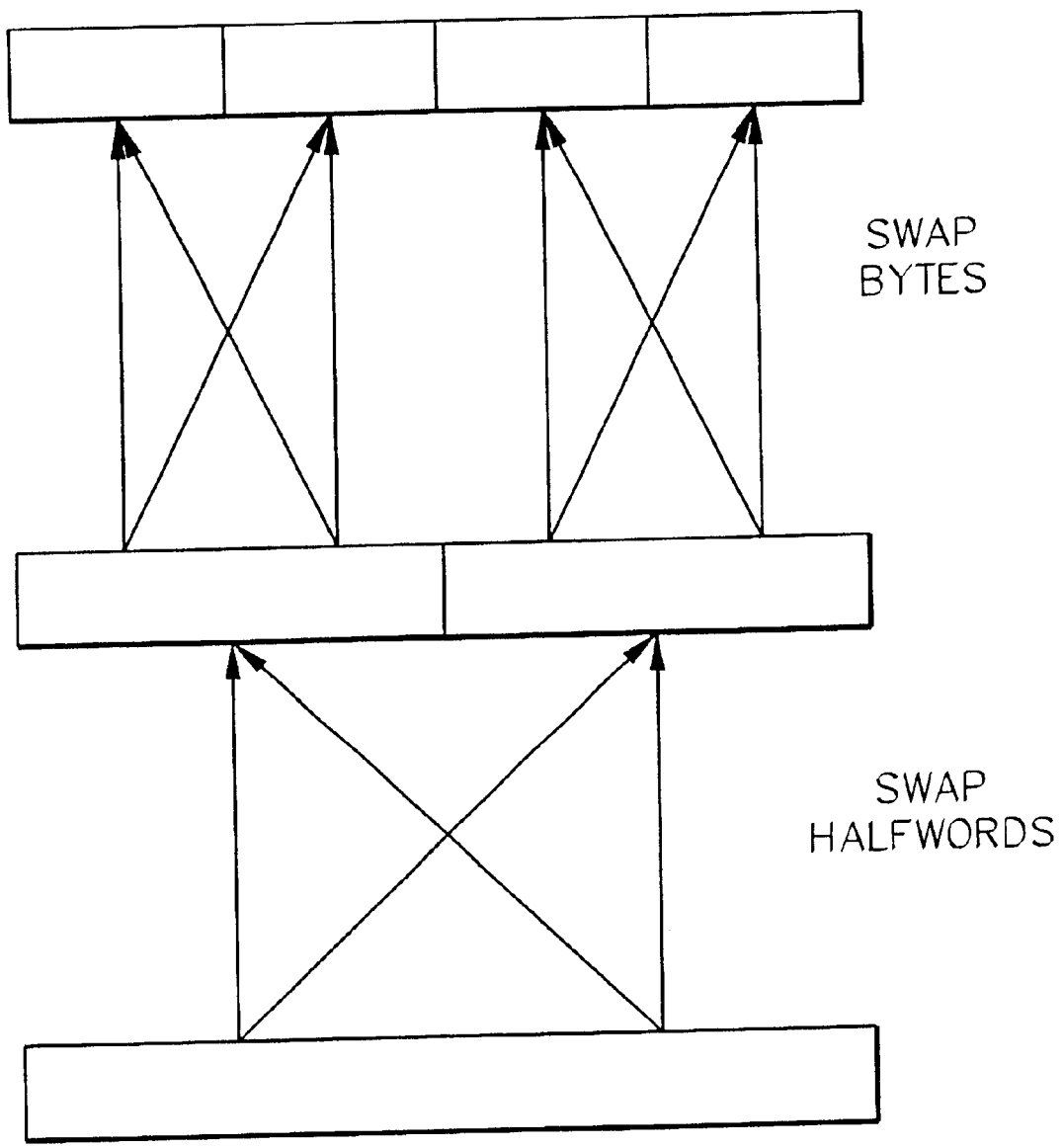
FIG. 6 is an illustration of one embodiment of data translation.

One embodiment of the present invention optionally performs data translation when data is transferred between the MP FIFO 302 and the buffer memory 112. As illustrated in FIG. 6, two 16 bit halfwords within a 32 bit word may be swapped, and two bytes within each halfword may be swapped. Bit 5 of the command register 408 is used to cause the halfwords within a word to be swapped. Bit 4 is used to cause bytes within halfwords to be swapped. These swapping functions advantageously allow data formatted in a big-endian format to be converted to a little endian format. Similarly, these swapping functions advantageously allow data formatted in a little-endian format to be converted to a big-endian format. For example, Fibre Channel conventionally uses the little-endian format, while the processors 106, 120 may use the big-endian format. In addition, the swapping function allows words transferred in or out of the FIFO 302 to be realigned on different boundaries.

Additional command information, including, buffer memory access direction, transfer count values, the source of buffer memory addresses, and comments, is provided in Table 3, below:

TABLE 3

| COMMAND | BUFFER MEMORY ACCESS DIRECTION | TRANSFER COUNT | BUFFER MEMORY ADDRESS | COMMENTS |
|---|---|---|---|---|
| NO OPERATION | NONE | 0 | N/A | |
| CLEAR FIFO | NONE | 0 | N/A | CLEAR FIFO READ/WRITE POINTERS & UTILIZATION COUNTER |
| STOP FIFO | NONE | 0 | N/A | FORCE STATE MACHINE TO IDLE STATE |
| LOAD FIFO | READ | XFER CNT REG | BUFFER XFER ADDR | |
| UNLOAD FIFO | WRITE | XFER CNT REG | BUFFER XFER ADDR | |
| LOAD FIFO W BCRC | READ | XFER CNT REG | BUFFER XFER ADDR | CHECK CRC WHILE LOADING FIFO |
| UNLOAD FIFO W BCRC | WRITE | XFER CNT REG | BUFFER XFER ADDR | GENERATE CRC WHILE UNLOADING FIFO |
| READ | WRITE | 64 | BUFFER XFER ADDR | |
| WRITE | WRITE | 64 | BUFFER XFER ADDR | |
| FETCH FCP COMMAND | READ | 64 | FCP FETCH ADDR PTR | CHECK CRC |
| UPDATE FCP POINTERS | NONE | 0 | N/A | UPDATE FCP ADDRESS AND COUNT & CLEAR COMMAND COMPLETE INTERRUPT |

In one embodiment, one or more of the commands listed above may be issued while another command is executing. For example, in one embodiment, the No Operation (NOP), the Clear FIFO, and the Stop FIFO commands can be issued while other commands are being executed.

The state machine 418 controls controller memory access resources, including the MP FIFO pointers, the MP FIFO buffer memory transfer counter 406, the Fibre Channel protocol (FCP) fetch address counters, the CRC accumulators, and the frame length counter. The state machine 418 can initialize these resources, set modes, and acts as the SDRAM requester.

FIGS. 5A–D illustrate one embodiment of the MP FIFO state machine 418.

Beginning at an Idle state 514, upon receipt of an Unload FIFO command, the state machine 418 proceeds to state 502, whereupon the process of unloading the FIFO 302 begins. If the FIFO 302 is not empty, the state machine 418 proceeds to state 504. The FIFO 302 is then continuously unloaded until only one word remains in the FIFO array 402 and the transfer count equals 1. The state machine 418 then proceeds to a state 506 where the last FIFO word is unloaded. Thus, when both acknowledge (ACK) signal from the MP FIFO arbiter and the data acknowledge (DACK) signal from the SDRAM controller active, then the last piece of data in the FIFO array 402 is transferred. The transfer count is set to 0 and the state machine 418 returns to the Idle state 514.

If an Unload FIFO with CRC command is received while in the Idle state 514, the state machine 418 proceeds to a state 508. The Unload FIFO with CRC command is used to write data from the FIFO array 402 to the buffer memory 112 while generating an associated CRC. In one embodiment, the CRC will be the last word written to the buffer memory 112. If the FIFO array 402 is empty, the state machine 418 remains in the Unload FIFO state 508. However, if the FIFO array 402 is not empty, the state machine 418 proceeds to a Unload FIFO state 510. The CRC calculation is performed as the FIFO array 402 is being unloaded and written into the SDRAM buffer memory. When the transfer count equals 1, the state machine 418 proceeds to an Unload FIFO state 512. When the CRC calculation is complete, the CRC data is transferred to the SDRAM buffer memory 112, and the transfer count is set to 0. The state machine 418 then proceeds back to the Idle state 514.

If the state machine 418 receives a Load FIFO command, then the state machine 418 proceeds from Idle state 514 to a Load FIFO state 516. The Load FIFO command is used to read data from the buffer memory into the FIFO array 402. If the state machine 418 is not full, then the state machine 418 proceeds to state 518 upon receipt of an MP FIFO acknowledge signal from the arbiter. The state machine 418 then causes data to be transferred from the buffer memory to 112 the FIFO array 402 until the transfer count is equal to 1, and the MP FIFO 302 generates an almost full signal. If the transfer count is equal to 1 and the FIFO array 402 is almost full, meaning that there is room for only one more data word, the state machine 418 proceeds to a Load FIFO state to 520. If the transfer counter is equal to 1, and the MP FIFO 302 generates a full signal, then upon receipt of an MP FIFO acknowledge signal from the arbiter and a DACK signal from the SDRAM controller, the last word is loaded into the FIFO array 402, and the state machine 418 proceeds back to the Idle state 514.

Upon receipt of a Load FIFO With CRC command, the state machine 418 proceeds to a Load FIFO with CRC state 522. The Load FIFO With CRC command is used to read data from the buffer memory 112, while checking the CRC. In one embodiment, the CRC is the last word to be transferred. At the state 522, if the MP FIFO 302 is not full, the MP FIFO read signal is activated, as is an MP FIFO CRC enable signal. Upon receipt of an MP FIFO acknowledge signal, the state machine 418 proceeds to a Load FIFO With CRC state 524. The state machine 418 proceeds to load data from the SDRAM buffer memory 112 into the FIFO array 402 until an almost full signal is asserted and the transfer count is greater than one. During this period, the CRC is calculated. The state machine 418 then proceeds to a load FIFO state with CRC 526. The state machine 418 causes the CRC to be loaded into the FIFO array 402. The transfer count is set to one, and the state machine 418 proceeds back to Idle state 514. Upon receiving a Write to Buffer Memory command, the state machine 418 proceeds from the Idle state 514 to the Write state 528. As previously described, the Write to Buffer Memory command is used to write data from the FIFO array 402 to the buffer memory 112. If the FIFO array 402 is not empty, the state machine 418 proceeds to a state 530 upon receipt of an acknowledge signal from the MP FIFO arbiter. The FIFO array 402 is then unloaded, and the unloaded data is written to the buffer memory 112. The FIFO unloading process continues until only one word remains in the FIFO memory and the transfer count equals one. The state machine 418 then proceeds to a state 532 where the last FIFO word is unloaded. Then, when both acknowledge (ACK) signal from the MP FIFO arbiter and the data acknowledge (DACK) signal from the SDRAM controller active, the last piece of data in the FIFO is transferred. The transfer count is set to 0 and the state machine 418 returns to the Idle state 514.

Upon receiving an Update FCP Pointers command, the state machine 418 proceeds from the Idle state 514 to the FCMD PTR state 528. A Command Pointer Increment signal is activated for one clock which updates the FCP address and count. The state machine 418 the proceeds to state 536 and clears the Command Complete interrupt. The state machine 418 then returns to the Idle state 514.

Upon receiving a Read Buffer Memory command, the state machine 418 proceeds from the Idle state 514 to a Read state 538 and asserts an SDRAM read signal. If the FIFO is not full, the state machine 418 proceeds to a state 540 upon receipt of an acknowledge signal from the MP FIFO arbiter. Data is then read from the buffer memory 112 into the FIFO array 402. The read process continues until the FIFO memory is almost full and the transfer count equals 1. The state machine 418 then proceeds to a state 542 where one more word is read from the buffer memory 112 into the FIFO. Then, when both acknowledge (ACK) signal from the MP FIFO arbiter and the data acknowledge (DACK) signal from the SDRAM controller are active, the transfer count is set to 0 and the state machine 418 returns to the Idle state 514.

Upon receiving a Fetch FCP command, the state machine 418 proceeds from the Idle state 514 to a FCP Command state 544. The state machine appropriately sets the FCP_CMD, RD_SIG, LD_CMD_LEN_ADR, CLR_FIFO, LD_XFER_CNT_64, and REQ_SIG, signals to prepare to get the packet length data located at the end of the packet. Thus, the transfer address is loaded with the frame length address. In one embodiment, the frame length address includes a base address added to a segment size. Proceeding to a state 546, the frame length data is retrieved. When both acknowledge (ACK) signal from the MP FIFO arbiter and the data acknowledge (DACK) signal from the SDRAM controller active, the frame length is placed in the FIFO array 402. Proceeding to a state 548, the CRC seed is reset and the transfer address is set to the start address, or base address, of the FCP command frame. When the acknowledge signal drops, the state machine proceeds to a state 550. The transfer of the packet from the buffer memory 112 begins, and the CRC accumulation begins. The transfer continues until the transfer count is equal to one. The state machine 418 then proceeds to a state 552, and the last word is transferred. The transfer counter is now equal to zero, and the state machine proceeds to the Idle state 514.

While certain preferred embodiments of the invention have been described, these embodiments have been presented by way of example only, and are not intended to limit the scope of the present invention. Accordingly, the breadth and scope of the present invention should be defined only in accordance with the following claims and their equivalents.

What is claimed is:

1. A method of context switching within a disk controller, comprising:

storing a first context in a first memory coupled to a first disk controller processor;

storing a second context in a second memory, the second memory configurable as both a random access memory and a first-in-first-out (FIFO) memory;

using the first disk controller processor, managing a first transfer operation related to the first context, wherein the first transfer operation transfers data from a disk drive to a communication link;

determining that the disk drive has fallen behind the communication links ability to receive data;

suspending the first transfer operation;

swapping the first context from the first memory with the second context stored in the second memory, wherein the first context is stored at an address location in the second memory identified by a write pointer, wherein the address identified by the write pointer is changed based at least in part on the size of the first context;

using the first disk controller processor, managing a second transfer operation corresponding to the second context;

restoring the first context to the first memory from the second memory after completing at least a portion of the second transfer operation;

completing the first transfer operation; and transferring disk data between the second memory and a buffer memory in a first-in-first-out manner.

2. The method as defined in claim 1, wherein the first memory is a register file.

3. The method as defined in claim 1, wherein the second context includes information related to the status of a data transfer.

4. The method as defined in claim 1, wherein the second context includes information related to a Fibre Channel Protocol header.

5. The method as defined in claim 1, wherein a copy of the first context remains in the second memory when the second context is swapped into the second memory.

6. The method as defined in claim 1, wherein a plurality of contexts are stored in the second memory concurrently.

7. The method as defined in claim 1, wherein the swapping is automatically performed in response to an exchange command.

8. A method of context switching within a disk controller, comprising;

storing a first context in a first memory coupled to a first disk controller processor;

storing a second context in a second memory, the second memory configurable as both a random access memory and a first-in-first-out (FIFO) memory;

using the first disk controller processor, managing a first transfer operation related to the first context, wherein the first transfer operation transfers data from a disk drive to a communication link;

determining that the disk drive has fallen behind the communication links ability to receive data;

suspending the first transfer operation;

swapping the first context from the first memory with the second context stored in the second memory, wherein the first context is stored at an address location in the second memory identified by a write pointer;

using the first disk controller processor, managing a second transfer operation corresponding to the second context;

restoring the first context to the first memory from the second memory after completing at least a portion of the second transfer operation;

completing the first transfer operation;

transferring disk data between the second memory and a buffer memory in a first-in-first-out manner; and modifying a buffer transfer count when transferring data between the second memory and the buffer memory, wherein the buffer transfer count is related to amount of data transferred from the second memory to the buffer memory, while the buffer transfer count is unaltered when performing the context swap.

9. The method defined in claim 8, wherein the first memory is a register file.

10. The method defined in claim 8, wherein the second context includes information related to the status of a data transfer.

11. The method defined in claim 8, wherein the second context includes information related to a Fibre Channel Protocol header.

12. The method defined in claim 8, wherein a copy of the first context remains in the second memory when the second context is swapped into the second memory.

13. The method defined in claim 8, wherein a plurality of contexts are stored in the second memory concurrently.

14. The method defined in claim 8, wherein the swapping is automatically performed in response to an exchange command.

15. A method of context switching within a disk controller, comprising:

storing a first context in a first memory coupled to a first disk controller processor;

storing a second context in a second memory, the second memory configurable as both a random access memory and a first-in-first-out (FIFO) memory;

using the first disk controller processor, managing a first transfer operation related to the first context, wherein the first transfer operation transfers data from a disk drive to a communication link;

determining that the disk drive has fallen behind the communication links ability to receive data;

suspending the first transfer operation;

swapping the first context from the first memory with the second context stored in the second memory, wherein the first context is stored at an address location in the second memory identified by a write pointer and modifying a FIFO usage count, the FIFO usage count related to the amount of the used locations in the second memory, when swapping the first context into the second memory, based at least in part on the size of the first context;

using the first disk controller processor, managing a second transfer operation corresponding to the second context;

restoring the first context to the first memory from the second memory after completing at least a portion of the second transfer operation;

completing the first transfer operation; and transferring disk data between the second memory and a buffer memory in a first-in-first-out manner.

16. The method defined in claim 15, wherein the first memory is a register file.

17. The method defined in claim 15, wherein the second context includes information related to the status of a data transfer.

18. The method defined in claim 15, wherein the second context includes information related to a Fibre Channel Protocol header.

19. The method defined in claim 15, wherein a copy of the first context remains in the second memory when the second context is swapped into the second memory.

20. The method defined in claim 15, wherein a plurality of contexts are stored in the second memory concurrently.

21. The method defined in claim 15, wherein the swapping is automatically performed in response to an exchange command.

* * * * *